United States Patent
Post et al.

(10) Patent No.: US 8,235,254 B2
(45) Date of Patent: Aug. 7, 2012

(54) ARTICULATED DRIVING MECHANISM AND DISPENSER COMPRISING SUCH A DRIVING MECHANISM

(75) Inventors: Egon Post, Brøndby Strand (DK); Jørgen Elmelund, Birkerød (DK)

(73) Assignee: M. Krøger Maskinfabrik A/S, Greve (DK)

( * ) Notice: Subject to any disclaimer, the term of this patent is extended or adjusted under 35 U.S.C. 154(b) by 855 days.

(21) Appl. No.: 11/721,100

(22) PCT Filed: Jun. 15, 2005

(86) PCT No.: PCT/DK2005/000390
§ 371 (c)(1), (2), (4) Date: Feb. 5, 2009

(87) PCT Pub. No.: WO2006/061017
PCT Pub. Date: Jun. 15, 2006

(65) Prior Publication Data
US 2009/0224006 A1    Sep. 10, 2009

(30) Foreign Application Priority Data
Dec. 9, 2004 (DK) .................................. 2004 01911

(51) Int. Cl.
*B65D 88/54* (2006.01)
(52) U.S. Cl. ............ 222/333; 222/326; 222/392; 59/84; 474/230; 74/89.2; 138/120
(58) Field of Classification Search .......... 222/326–327, 222/333, 386, 390–392; 52/108; 474/206, 474/218, 220, 224–225, 230; 74/89.2; 138/110, 120; 59/78, 78.1, 84, 93, 95
See application file for complete search history.

(56) References Cited

U.S. PATENT DOCUMENTS

| 3,234,698 A | 2/1966 | Kimblern |
| 3,841,169 A * | 10/1974 | Bisewski ...................... 474/231 |
| 4,885,907 A | 12/1989 | Pappanikolaou |
| 5,157,912 A | 10/1992 | Yoshiga et al. |
| 6,321,945 B1 | 11/2001 | Girouard et al. |
| 6,890,278 B2 * | 5/2005 | Prince ........................ 474/206 |

FOREIGN PATENT DOCUMENTS

| DE | 3513880 A1 | 10/1986 |
| DE | 4317427 A1 | 12/1994 |
| DE | 101 03 490 A | 8/2002 |
| DE | 10103490 A1 | 8/2002 |
| WO | WO02064995 A2 | 8/2002 |

* cited by examiner

*Primary Examiner* — Kevin P Shaver
*Assistant Examiner* — Andrew Bainbridge
(74) *Attorney, Agent, or Firm* — Sughrue Mion, PLLC

(57) ABSTRACT

An articulated driving mechanism for a dispenser which in one embodiment is a caulking gun has a series of rigid links that are secured to one another by pins. The pins can slide in a slot which allows the links to space away from one another in a first position or be squeezed side by side which then prevents any rotation in a second position. The links all have ratchet teeth to engage two different driving wheels. The two driving wheels rotate at different speeds which allows the links to be consistently opened before reaching a circumferential wheel so that then the spaced links can rotate and safely and reliably rotate as they follow the circumference of the wheel. The articulated driving mechanism is used as a substitute for a push rod in a caulking gun in at least one embodiment.

39 Claims, 29 Drawing Sheets

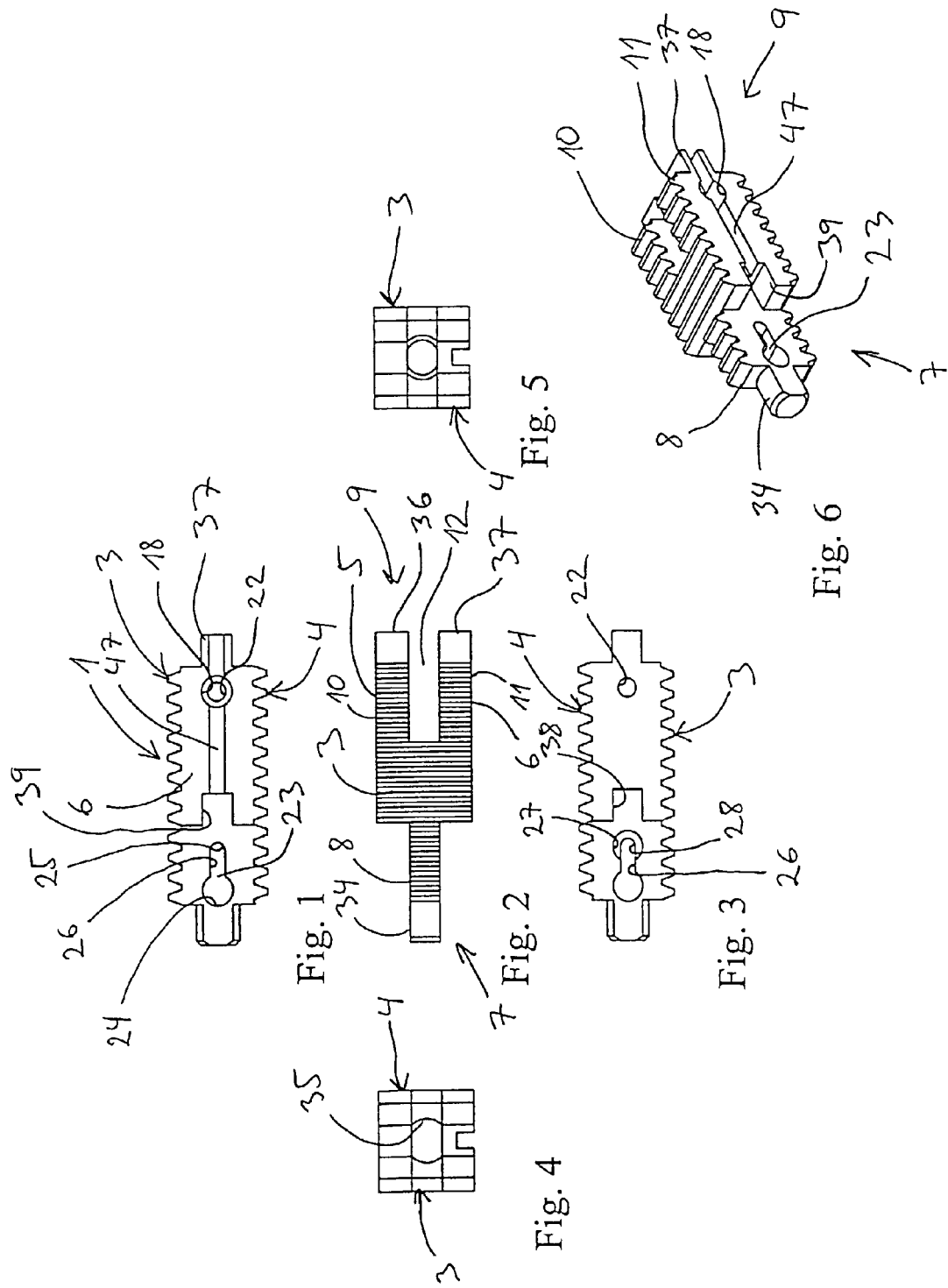

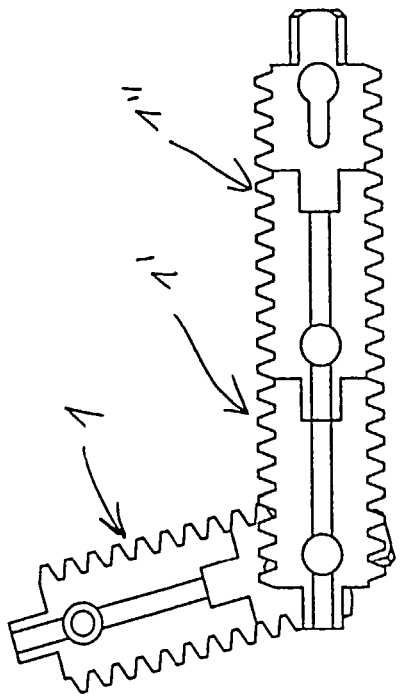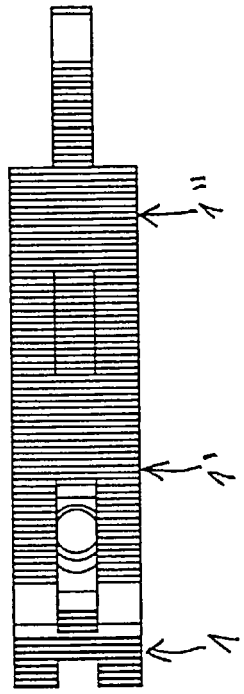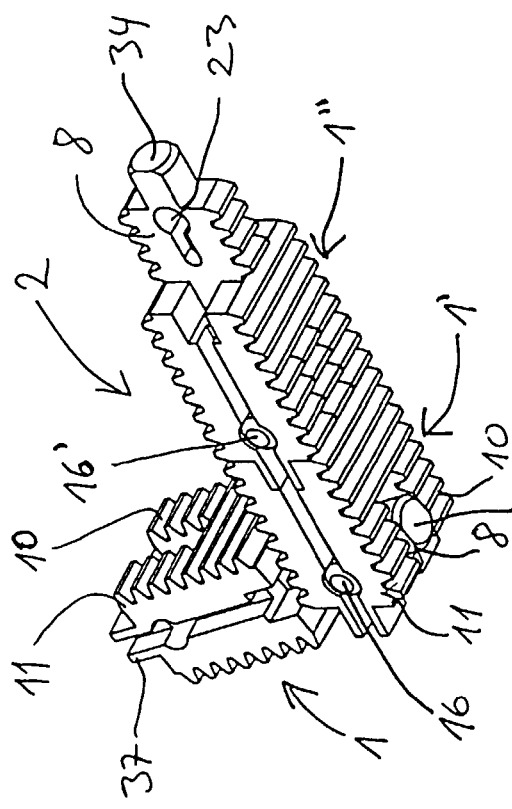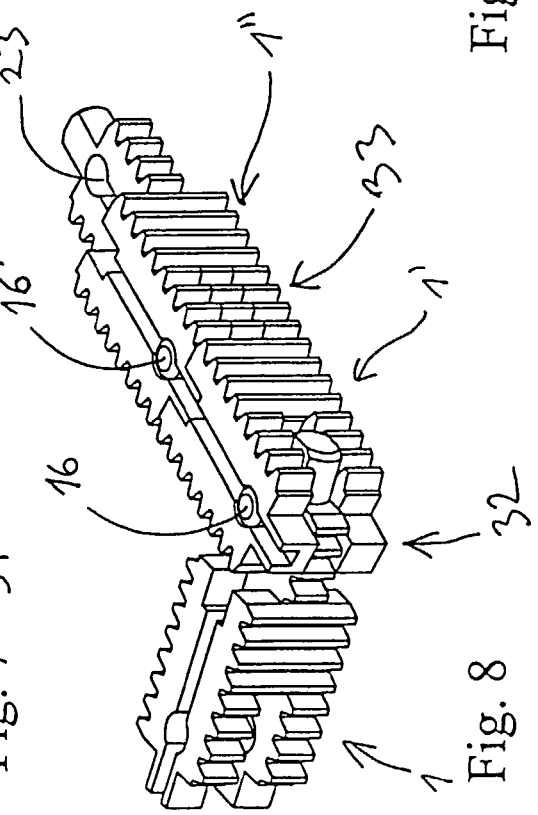

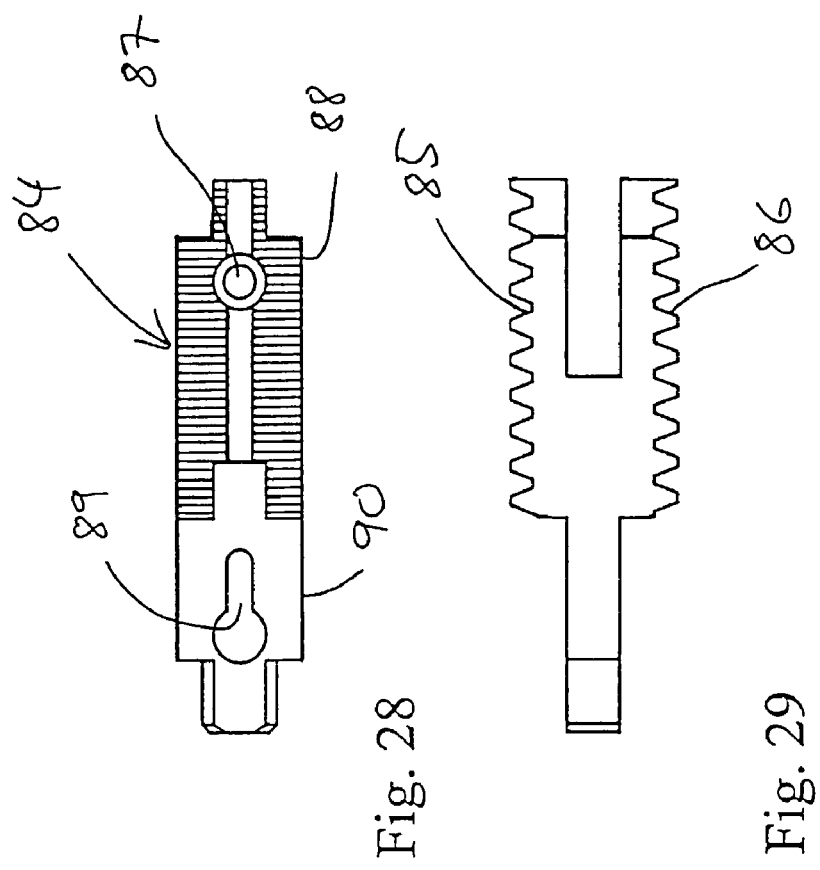
Fig. 28
Fig. 29
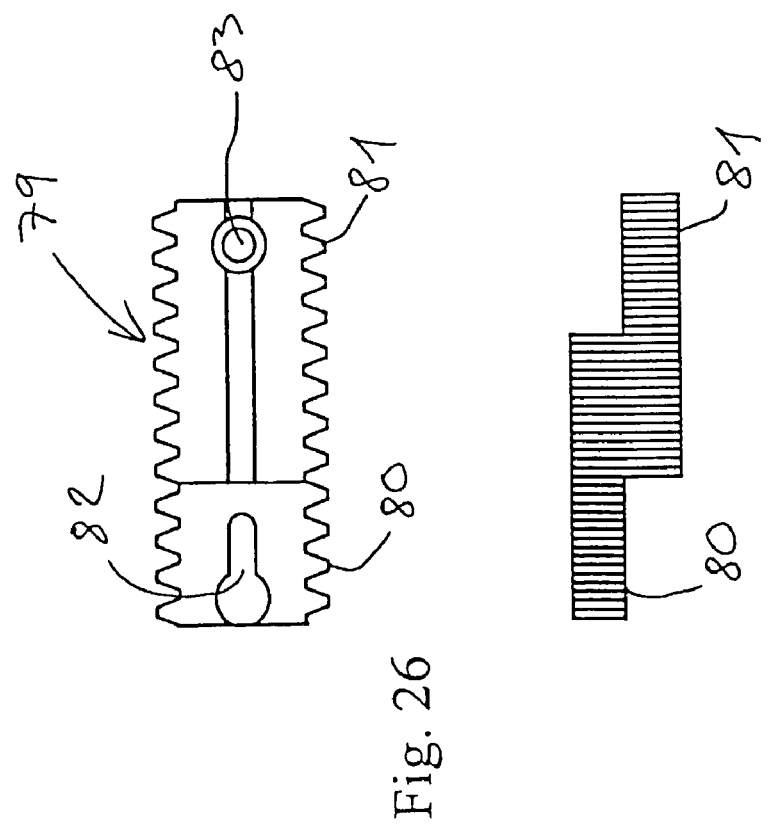
Fig. 26
Fig. 27

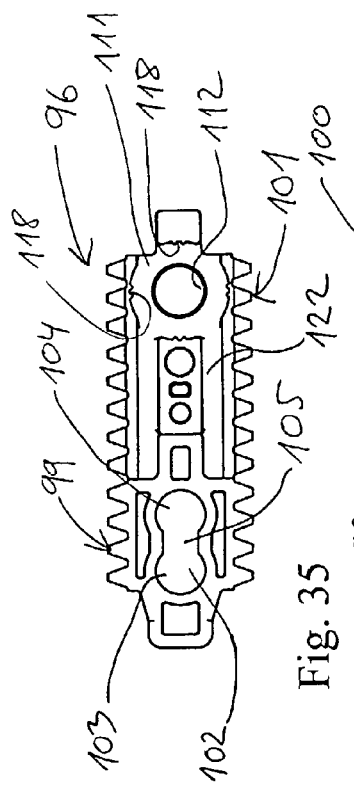
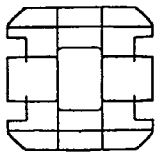
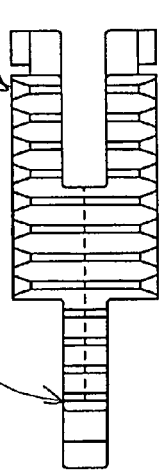
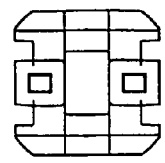
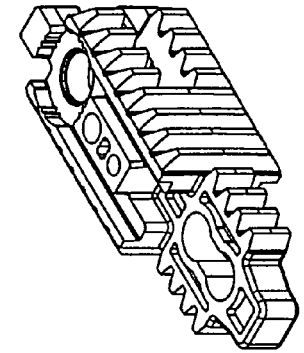
Fig. 35
Fig. 36
Fig. 37
Fig. 38
Fig. 39
Fig. 40

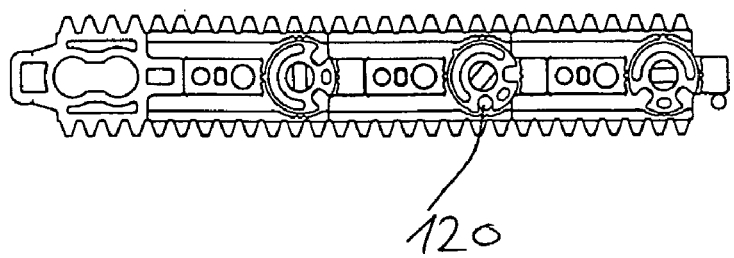
Fig. 50 A
Fig. 50 B
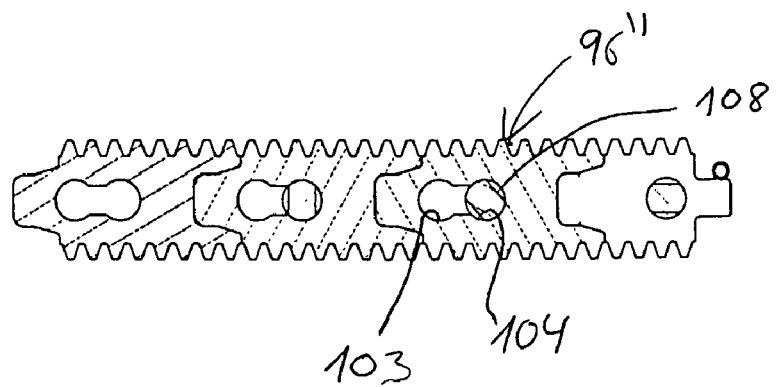
Fig. 50 C
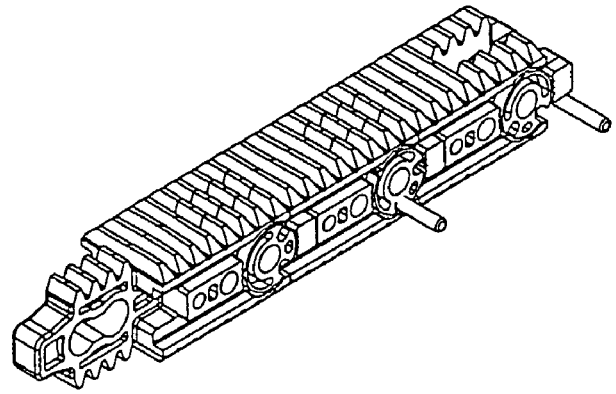
Fig. 50 D

ARTICULATED DRIVING MECHANISM AND DISPENSER COMPRISING SUCH A DRIVING MECHANISM

BACKGROUND OF THE INVENTION

The invention relates to an articulated driving mechanism composed of several inflexible links in succession, the links of each pair of adjacent links being interconnected by means of a link pin, which is arranged in both the adjacent links in such a manner that the links are pivotal in relation to one another about the axis of the pin, and each pair of adjacent links being lockable against pivoting in relation to one another.

U.S. Pat. No. 3,234,698 describes a chain-like link mechanism, composed of elongated chain links. Each chain link is formed by two elongated link plates, held spaced apart in parallel by means of two transverse pins, which are rigidly connected with the link plates, for example, by welding, and are spaced apart at a distance from the respective ends of the chain link. In every second chain link, the link plates are spaced apart with a smaller distance than in the adjacent links, so that the ends of this link may be inserted between the link plates of the respective adjacent links. At the opposite ends of the link plates of each chain link, a U-shaped indentation is formed, constituting a kind of fork, which can be pushed onto the pin of an adjacent link. In this position, in which a fork at either end of each chain link is grasping a pin of each adjacent link, the chain links are unable to pivot in relation to one another. In order for the chain links to be held in this interlocking position, each chain link has plate-shaped locking members at one end, one end of which is pivotally arranged about the respective ends of the pin located at this end, and the other end of which has L-shaped cutouts, grasping around projecting ends of the closest pin of the adjacent member. In a first position of the locking member, the end of the pin is located in a leg of the L-shaped cutout, said leg being transverse relative to the chain links, so that the chain links are inseparable, since separation is only possible by displacing said chain links in their longitudinal direction away from one another. In a second position of the locking member, the end of the pin can slide along a leg of the L-shaped cutout, said leg being longitudinal relative to the chain links, so that the pins of the chain links can slide out of the respective forks of the adjacent members. In this pushed out position, adjacent links are pivotal in relation to one another, in that one link can pivot in relation to the locking member about the axis of the pin, the ends of which are arranged in the L-shaped cutouts of the locking member, and in that the other link can pivot about the axis of the pin, about the ends of which the locking members are pivotally arranged. In this position, the locking members therefore function as a kind of short chain links, holding the long links together two and two. However, as a consequence of the elongated chain links, this link mechanism is not particularly flexible, and in its flexible state it cannot be pushed into a channel, unless an end of it is pulled, because the resulting frictional resistance between the links and the channel walls would then be too great. Furthermore, the function of this link mechanism depends on its spatial orientation, because the locking members may unintentionally pivot to the unlocked position, in which the chain links are separable, for example, when advancing the link mechanism horizontally.

WO 02/064995 describes a chain composed of links, which are selectively capable of rigid engagement with one another. Each chain link is composed of two plate-like link plates spaced apart, the ends of which are pivotally connected with the adjacent link by means of a pin. The chain is alternately composed of links, the link plates of which are held at a fixed distance from one another, and links, the link plates of which are spring-loaded for abutment against the respective inner sides of the link plates of the adjacent link by means of a compression spring arranged around each pin. In the spring-loaded position, in which the link plates of the adjacent links are pressed against one another, mutually abutting meshing surfaces of the respective link plates of the adjacent links cause the links to be locked in a position, in which they are arranged in succession along a line. By passing the chain through a narrowing channel, the link plates of every second chain link, which are spring-loaded away from one another, can be pressed against one another, so that these link plates disengage from the link plates of the adjacent links, so that the adjacent links can be pivoted in relation to one another about the pins connecting them. When the spring-loaded link plates are pressed together by insertion in the narrowing channel, a rather large amount of friction, however, occurs between the link plates and the channel wall, and driving this chain therefore requires a relatively large amount of energy.

U.S. Pat. No. 4,885,907 describes a so-called chain bar composed of chain links, in which a projecting flange of a link is inserted in a fork member of an adjacent link and arranged pivotally therein about a pin. About the edges of the flange, three circular arcuated cutouts are distributed, in which the periphery of a bolt arranged in a longitudinally displaceable manner in the fork link can engage, so that the flange is lockable against rotation about the pin in three different positions. When displacing the bolt in its longitudinal direction, it can be brought into a position, in which a cutout at its periphery allows passage of the flange edges projecting between the circular arcuated cutouts, so that the chain links are free to rotate in relation to one another about the pin. Since the links are held together by the pins in the same manner as in a conventional chain, in the locked position as well, the sum of the play between the individual links will, as known, cause quite a significant backlash in the longitudinal direction of the link mechanism, and therefore it is not suitable for advancing an object accurately.

U.S. Pat. No. 6,321,945 describes a motor driven dispenser for dispensing caulking or glue material comprising a cylindrical cartridge holder, in which a conventional caulking material or glue cartridge can be inserted through an end opening of the cartridge holder. A piston is displaceable in the cartridge holder for dispensing caulking material or the like, the piston being fastened at a first end of a toothed rack, which is divided into links along part of its length. At the lateral face of the toothed rack opposite the toothing, the links are hinged to one another, so that the toothed rack is flexible. The toothed rack can be driven back and forth by a motor driven toothed wheel engaging with the toothed rack toothing, which faces downwards towards a handle of the caulking dispenser. When retracting the piston in the cartridge holder, the end of the toothed rack opposite the piston is displaced about a guide wheel, so that it follows a U-shaped path and thus does not project from the rear end of the caulking gun. However, a disadvantage of this apparatus is that the end of the flexible toothed rack opposite the piston passes across the top side of the cartridge holder, making it impossible to design this apparatus with an upwardly open cartridge holder for rapid positioning of the caulking material cartridge. Since the toothed rack is upwardly flexible when advanced in the cartridge holder, an upwardly open cartridge holder would furthermore mean that the toothed rack with the piston would not be securely fixed, when no cartridge is mounted. The hinging of the links of the toothed rack further causes a backlash when retracting the piston, but also when advancing it, since the piston is able to twist in the caulking material cartridge as a consequence of the flexibility of the toothed rack.

DE 35 13 880 describes a motor driven caulking gun, the piston of which is advanced by a chain running along a U-shaped path about a guide wheel, and the end of which, opposite the piston, is conveyed back and forth by means of a worm drive. The inherent backlash of the chain causes inaccurate controlling of the piston, both when caulking and when retracting the piston in order to prevent afterflow.

SUMMARY OF THE INVENTION

The object of the present invention is to present an articulated driving mechanism, allowing accurate advancing of an object at low friction.

To achieve this, the articulated driving mechanism according to the invention is characterized in that the links of each pair of adjacent links are mutually displaceable in the transverse direction of the link pin between a first position, in which the adjacent links are pivotal in relation to one another about the axis of the link pin, and a second position, in which mutually corresponding meshing surfaces of each adjacent link abut one another and lock against mutual pivoting of the adjacent links, and in that the link pin is displaceable in an elongated hole in at least one of the links.

By suitable positioning of the mutually corresponding meshing surfaces of each adjacent link, using the driving mechanism in the second, locked position of the adjacent links thus allows the meshing surfaces to be pressed against one another, so that a self-reinforcing effect of the interlocking engagement of the adjacent links is achieved, thus reducing backlash to an absolute minimum. Furthermore, since the adjacent links are not pivotal in either one or the other direction in relation to one another in their second, locked position, a piston, for example, can be advanced very accurately, because it is unable to twist within its cylinder. As a further example, a table top or the like could be raised and lowered very accurately, because it is possible to press the meshing surfaces of the adjacent links against one another by means of the weight of the table.

In an advantageous embodiment, the elongated hole extends along a longitudinal axis of the link in which it is formed, the longitudinal axis running through the two pins arranged in said link. This results in the driving mechanism being as narrow as possible in the first position of the adjacent links, in which these are pivotal in relation to one another, which is an advantage when advancing the driving mechanism in a channel, for example. Furthermore, this means that when the driving mechanism, for example, is used for driving forward a piston, the compressive force between the meshing surfaces of the adjacent links is as great as possible, thus minimizing backlash.

In a preferred embodiment, the elongated hole is composed of two cylindrical holes connected by a slot having a width, which is smaller than a diameter of each of the cylindrical holes, and the link pin has a locking section located in the elongated hole and having a first cross-sectional dimension, which is smaller than or equals the width of the slot, and a second cross-sectional dimension, which is larger than the width of the slot. Thus, by pivoting about its axis, the link pin can selectively assume a position, in which it is retained in one of the cylindrical holes, or a position, in which it is displaceable from one cylindrical hole to the other through the slot between these.

In a structurally advantageous embodiment, the locking section of the link pin is cylindrical having a diameter, which corresponds to the second cross-sectional dimension of the locking section, and it has two opposing recesses, each having a flat bottom, the bottoms of the two recesses being mutually parallel and having a mutual distance corresponding to the first cross-sectional dimension of the locking section. In this way, easy rotation of the link pin in the cylindrical holes is ensured, because it has a cylindrical section located in one of the holes. The parallel bottoms of the recesses may ensure that the link pin is only displaceable from one cylindrical hole to the other in a definitely defined position.

In an advantageous embodiment, the link pin has a disc-shaped head at one end, the head having two spaced indentations along its periphery. These indentations may serve to engage with a stationary stud, whereby the link pin is rotatable between different positions in the adjacent links connected by it, when the driving mechanism passes by the stud.

In an embodiment, the indentations are placed with a mutual angle of substantially 90 degrees. This is an advantage, in particular if the recesses of the link pin have parallel bottoms with a mutual distance corresponding substantially to the width of the slot in the links of the driving mechanism, because the function of the link pin, when displacing it along the slot and when retaining the links in relation to one another, respectively, is hereby optimum.

In a structurally advantageous embodiment, the link pin has at least one latch means, which, when pivoting the link pin, is able to retain the link pin in three different positions in relation to one of the two adjacent links connected by the link pin, the link pin being displaceable in its transverse direction in the elongated hole in one of these positions and being locked against displacement in the elongated hole in the two other positions. It may thus be ensured that the link pin does not unintentionally pivot between said three positions.

In a further structurally advantageous embodiment, at its periphery opposite the space between the two indentations, the head has a projection, which can engage with one of three corresponding indentations, which are formed with a spacing of approximately 90 degrees in one of the two adjacent links connected by the link pin. By placing the indentations with a 90 degrees spacing, the above-mentioned advantage is achieved.

In an embodiment, in the head, radially within said projection, an arcuated recess is formed enabling the projection to be radially resilient in relation to the head. In this way, the spring power for the projection can easily be adjusted, so that a suitable retaining force for the link pin in its positions is achieved by constructing the arcuated recess with a suitable width.

In an embodiment, at its end opposite the head, the link pin has resilient flanges enabling the link pin to be retained in relation to one of the two adjacent links connected by the link pin. Thus, mounting the link pins in the links is facilitated, in that the pins can merely be pressed into the cylindrical holes, until the resilient flanges engage under an edge of one end of the hole in question.

In an embodiment, each pin is arranged in a male part in the form of a flange of one adjacent link and in a female part in the form of two flanges with an intermediate slot of the other adjacent link, the flange of the male part is located between the two flanges of the female part, the elongated hole is formed in the flange of the male part, each link has a slot in a lateral face along its longitudinal axis, and the periphery of the pin head projects into the slot of the female part and preferably flushes with said lateral face. In this way, a stationary stud of the above-mentioned type may project into the slot when the links of the driving mechanism passes by, and by engagement with indentations, also of the above-mentioned type, in the periphery of the pin head, the stud may cause the pin to pivot between its different positions. Because the link pin head is recessed in relation to said lateral face, the lateral face may be guided by sliding against stationary walls.

In an advantageous embodiment, the pin is arranged in such a manner that, in each pair of adjacent links, it is displaceable in its longitudinal direction between a first position, in which it is displaceable in its transverse direction in the elongated hole, and a second position, in which it is locked against displacement in its transverse direction in the elongated hole. It is thus possible to lock the adjacent links in relation to one another in their first mutually pivotal position or their second mutually locked position. Therefore, the driving mechanism enables transmission of both compressive and tensile forces in the first and/or the second position of the adjacent links.

In an advantageous embodiment, the elongated hole is composed of two cylindrical holes, connected by a slot, which is narrower than a diameter of each of the cylindrical holes, and the pin has a first section with a diameter, substantially corresponding to a diameter of each of the cylindrical holes, and a second section with a diameter, which is smaller than the width of the slot. In this way, when placing the first section of the pin in one of the cylindrical holes comprised by the elongated hole, the pin enables the adjacent links to be retained in relation to one another, more or less without backlash, in both their first and second positions. When displacing the pin in such a manner that its second section is located in the elongated hole, the pin will be displaceable in its transverse direction from one cylindrical hole to the other, so that the adjacent links are displaceable between their first and second positions.

In an embodiment, the cylindrical hole, comprised by the elongated hole and located closest to the centre of the link, has a first section with a diameter, substantially corresponding to the diameter of the first section of the pin, and a second section with a diameter, which is smaller than the diameter of the first section of the pin, and the pin is spring-loaded in a direction from its first section to its second section. Hereby, the pin can be retained in a locked manner in said cylindrical hole by means of the spring loading, in that the spring loading presses the first section of the pin into the first section of the cylindrical hole, whereby a shoulder between the first and the second section of the pin abuts a shoulder between the first and the second section of the cylindrical hole, so that the pin is retained in the cylindrical hole. Since said cylindrical hole is located closest to the centre of the link, the connected adjacent links of the pin 2 are located in their second position, in which they are locked against mutual pivoting. In this particular position, in which it has the form of a bar, the driving mechanism is suitable for advancing an object such as a piston, and an advanced part of the link mechanism will thus be projecting freely, and therefore it is an advantage that the pin is retained in the cylindrical hole. On the other hand, when the adjacent links are located in their first position, in which they are pivotal in relation to one another, the driving mechanism may advantageously be guided in a channel, so that the pin is held in place in the cylindrical hole, comprised by the elongated hole and located farthest away from the centre of the link, by means of a lateral wall of the channel. In this case, the latter cylindrical hole need not comprise a shoulder for retaining the pin, and therefore it will be easier to mount the pin in the links, since these are merely pushed into one another, after which the pin is inserted in the latter cylindrical hole.

In an embodiment, the mutually corresponding meshing surfaces of each adjacent link abut one another by means of wedging in the second, locked position of the adjacent links. Hereby, backlash between the adjacent links is reduced to an absolute minimum. Furthermore, in the second, locked position of the adjacent links, the driving mechanism may be subjected to a certain tensile force, without the adjacent links being displaced from their second, locked position to their first, pivotal position, and without the need for the pin to be arranged in such a manner that it is lockable against displacement in its transverse direction in the elongated hole. The driving mechanism may thus, for example, be used for driving forward a piston by exercising significant forces and subsequent retraction of the piston by exercising significantly less force, whereby the adjacent links are held together as a consequence of the wedging effect between them. In particular, if the driving mechanism is under constant stress by a compressive force, as in the case of raising and lowering a table top, an embodiment in which the pin is not locked in its transverse direction may be applicable, because the adjacent links will be secured against separation by means of the constant compressive force.

In an embodiment, each pin is arranged in a male part in the form of a flange of one of the adjacent links and in a female part in the form of two flanges with an intermediate slot of the other adjacent link, and the flange of the male part is located between the two flanges of the female part. In this manner, the driving mechanism is ensured a good bending rigidity about a direction perpendicular to the pin. Furthermore, suitable meshing surfaces for ensuring minimum backlash are achieved.

In an embodiment, each link comprises a male part and a female part. It is thus possible for all the links to be alike, which facilitates manufacturing. Furthermore, it is thus possible to achieve a shorter link length, because a link having two female parts cannot be made as short as a link having a male part and a female part.

In an embodiment, at its outer end, the male part has a stud, which fits into a corresponding hole of the female part, at the bottom of its slot, and/or the flanges of the female part have a stud at their outer ends, which fits into a corresponding recess of the male part opposite its outer end. Thus, a minimum backlash between two adjacent links in their second, locked position is achieved, and, in addition to this, a particularly high bending rigidity between these is achieved.

In a structurally advantageous embodiment, the elongated hole is formed in the flange of the male part, a first end of the pin is arranged with an intermediate compression spring in a cylindrical blind hole in one flange of the female part, and another end of the pin is arranged in a cylindrical hole in the other flange of the female part.

In an embodiment, in a lateral face, each link has a slot along its longitudinal axis, and the pin is spring-loaded towards a position, in which an end portion of the pin projects from the bottom of the slot and preferably flushes with said lateral face. Since the pin does not project from the lateral faces of the links, the driving mechanism can slide into a channel, without the pin scraping against the channel wall, and the pin can be displaced from its second position, in which it is locked against displacement in its transverse direction in the elongated hole, to its first position, in which it is displaceable in its transverse direction in the elongated hole, when advancing the driving mechanism in relation to a flange projecting into the slot of the passing links, which are thus also guided by the flange.

In an embodiment, each link forms a section of a toothed rack, so that the links in the second position, in which the adjacent links are locked against pivoting in relation to one another, form a continuous toothed rack. Hereby, it is possible to advance the driving mechanism in a significantly more accurate manner, and at the same time, very large forces can be transferred.

In an embodiment, each link comprises two opposing tooth surfaces. Hereby, it is possible to advance the driving mechanism in a further accurate manner, as well as to transfer further large forces. In particular, parallel advancing of the driving mechanism without transversely displacing it is ensured.

In an embodiment, the mutual displacement distance of the adjacent links between their first position and their second position equals an integer times the tooth pitch of the tooth surfaces. Thus, it is possible for the successive links of the driving mechanism to form a continuous, uninterrupted tooth surface in their second, locked position.

In an embodiment, both the flanges of the male part and the female part form a part of one of said tooth surfaces. Thus, large meshing surfaces between adjacent links are achieved, because they can extend across the entire width of the links.

In an embodiment, the links are made of plastic, preferably polyacrylamide, and the link material is glass-reinforced, preferably by approximately 50 percent fibreglass. In this way, the driving mechanism can be manufactured relatively easily, but with a good rigidity. Furthermore, a good engagement is achieved with driving wheels made of metal.

In an embodiment, the driving mechanism is arranged in a longitudinally displaceable manner by means of a drive wheel and a displacement wheel, engaging with each their link of the driving mechanism, and the driving wheel and the displacement wheel are driven at different roll speeds on their respective pitch circles, so that, at longitudinal displacement of the driving mechanism, the adjacent links are displaceable between their first position and their second position, as a consequence of the rotation of the driving wheel and the displacement wheel. Hereby, in its inflexible state, the driving mechanism can be pushed forward, for example, by means of a motor, and the driving mechanism can be retracted, whereby it assumes its flexible state and can thereby be stored in an arcuated channel. This channel may have any suitable shape such as a U-shape or S-shape or a combination thereof, for example, having intermediate straight sections.

In an embodiment, a stationary ramp is arranged in the area between the driving wheel and the displacement wheel, and, when the links pass by, it displaces the pins between their first position and their second position, so that the links of at least one pair of adjacent links at a time are displaceable in relation to one another. In this way, no further moveable members are necessary for displacing the pins, since this takes place automatically when the driving mechanism passes by the stationary ramp.

In an embodiment, in the area between the driving wheel and the displacement wheel, two spaced apart stationary studs are arranged, which project into the slot, when the links pass by, and pivot the link pins between their three different positions when engaging, one at a time, with one of the two spaced apart indentations of the link pin heads, so that the links of at least one pair of adjacent links at a time are displaceable in relation to one another. In this way, the pivoting of the pins between their positions may take place automatically when the driving mechanism passes by the stationary studs.

The invention also relates to a dispenser for pressing out material from a cartridge device, the dispenser comprising an articulated driving mechanism as described above.

In an embodiment, a first end of the driving mechanism is provided with a piston for pressing out material from a cartridge device, at the cartridge device, a first driving wheel and a second driving wheel are journaled, the driving wheels being located in front of one another, being driven synchronously, counter-rotating and engaging with opposite tooth surfaces of the articulated driving mechanism, at a distance from the driving wheels and opposite the cartridge device in relation to those, a displacement wheel in engagement with a tooth surface of the articulated driving mechanism is journaled, the displacement wheel being located on the same side of the driving mechanism as the first driving wheel and being driven with the same direction of rotation as this, but at a greater roll speed on its pitch circle, and a second end of the driving mechanism is guided in a U-shaped channel.

Hereby, a particularly accurate back and forth movement of the piston in the dispenser can be achieved, so that, for example, caulking material can be metered very accurately, and so that afterflow of caulking material can be avoided by suitable retraction of the piston. Furthermore, the driving mechanism with the piston is capable of exercising extraordinary great forces on the piston of the cartridge, without affecting the accuracy.

In an embodiment, the displacement wheel is driven at such a difference in roll speed on its pitch circle compared to the driving wheels that when the driving mechanism has been displaced by a link length by means of the driving wheels, it has been displaced by a link length plus the mutual displacement distance of the adjacent links between their first position and their second position by means of the displacement wheel. In this way, the driving wheels and the displacement wheel can be placed as close as possible, and thus the dispenser can be constructed very compact.

In an embodiment, the length of a link of the driving mechanism corresponds to eight times the pitch on the tooth surface of that link, the mutual displacement distance of the adjacent links between their first position and their second position corresponds to two times the pitch, the axis distance between the displacement wheel and the first driving wheel located on the same side of the driving mechanism corresponds to 14 times the pitch, and the roll speed on the pitch circle of the displacement wheel is $5/4$ the roll speed on the pitch circle of the first driving wheel. Hereby, a very compact dispenser can be achieved, which is capable of exercising great forces on the piston.

In an embodiment, the displacement wheel has 10 teeth and is connected by means of a shaft with a rearwardly located wheel having 16 teeth and being driven by an intermediate wheel having 22 teeth, and the intermediate wheel is engaging with a first wheel located in front having 24 teeth and being connected by means of a shaft with the first driving wheel having 12 teeth. Hereby, a further compact dispenser is achieved.

In an embodiment, via a first claw coupling, the intermediate wheel is driven by a first gear wheel engaging with a large driving wheel, via a second claw coupling, the large driving wheel drives a second gear wheel engaging with a second wheel located on front and being connected with the second driving wheel by means of a shaft, the first claw coupling is arranged in such a manner that it only transfers rotational movement, when the large driving wheel is rotating in a direction causing the first end of the driving mechanism to be pulled in from the cartridge device, and the second claw coupling is arranged in such a manner that it only transfers rotational movement, when the large driving wheel is rotating in a direction causing the first end of the driving mechanism to be pushed into the cartridge device. It is thus possible to drive the dispenser by means of, for example, an electric motor, which can operate at an optimum rotational speed when pressing out material from a cartridge at a suitable speed, and which can subsequently drive the piston back at a significantly higher speed, also at an optimum rotational speed of the motor.

In an embodiment, the first claw coupling comprises a first coupling part, mounted in a longitudinally displaceable manner, but rotationally fixed, on a first coupling shaft, on which the intermediate wheel is fixedly mounted, this first coupling part has tilted teeth for engagement with corresponding teeth on a second coupling part formed integrally with the first gear wheel, the second claw coupling comprises a first coupling part, mounted in a longitudinally displaceable manner on a second coupling shaft, on which the large driving wheel is fixedly mounted, a stud projecting from this second coupling shaft engages with an elongated hole of the first coupling part, said elongated hole being tilted in relation to the longitudinal axis of the shaft, the first coupling part of the second claw coupling is spring-loaded away from and has tilted teeth for engagement with corresponding teeth on a second coupling part formed integrally with the second gear wheel, and the first coupling part of the first claw coupling and the first coupling part of the second claw coupling are mutually connected by means of a plate member for mutually, longitudinally displacing one another. The displaceable plate member ensures that only one of the two claw couplings can be brought into engagement at a time. It is possible to leave out the plate member, if the displaceable coupling parts of both claw couplings are placed on the same shaft and the various engaging wheels are suitably adjusted.

In a structurally advantageous embodiment, the displacement wheel is connected by means of a shaft with a rearwardly located wheel driven by an intermediate wheel, and the intermediate wheel is engaging with a first wheel located in front, which is connected by means of a shaft with the first driving wheel, a second wheel located in front, which is connected by means of a shaft with the second driving wheel, is engaging with the first wheel located in front, the second wheel located in front is engaging with a second gear wheel, and a large driving wheel is fixedly mounted on a drive shaft, on which a coupling member is mounted for rotation together with the drive shaft and axially displaceable on this, so that, in a first position, the coupling member is engaging with the second gear wheel, and, in a second position, it is engaging with a medium-sized driving wheel mounted rotatably on the drive shaft and engaging with the second driving wheel. By displacing the coupling member, it is easy to change between two different gear ratios, so that the dispenser piston, for example, may be driven at a higher velocity during retraction, in which case a smaller amount of piston force is required compared with driving the piston forward.

In a further structurally advantageous embodiment, the coupling member has an inner toothing for engagement with the toothing of the second gear wheel in the first position of the coupling member and a claw part for engagement with a claw part of the medium-sized driving wheel in the second position of the coupling member. Thus, in its first position, the coupling member may drive the piston forward, and in its second and thereby temporary position, it may retract the piston. The inner toothing of the coupling member ensures a firm engagement with the toothing of the second gear wheel in the first, ordinary driving position of the coupling member, in which a large amount of force is required, and the claw part of the coupling member ensures a quick and unproblematic change into engagement with the claw part of the medium-sized driving wheel when changing into the second, temporary position of the coupling member.

In an advantageous embodiment, the coupling member has a peripheral collar, around which a fork member is grasping, the fork member being displaceable in parallel with the drive shaft and being spring loaded in a direction for displacement of the coupling member towards its first position. Thus, at displacement, the fork member is able to move the coupling member between its two positions, because it is held in the ordinary operating position by the spring load. This may take place although the coupling member is still rotating.

In an embodiment, the U-shaped channel is composed of two legs connected by an arch, and one leg curves in under a bottom of the cartridge device, and preferably approaches a longitudinal axis of the other leg in the direction towards its free end. Thus, a particularly compact configuration of the dispenser is achieved.

In an embodiment, the U-shaped channel is composed of two legs connected by an arch, one leg curving in under a bottom of the cartridge device, this leg continuing into a downwardly curving leg running along a handle of the dispenser, so that altogether an approximately S-shaped channel is formed for the driving mechanism. In this way, an even longer driving mechanism may be accommodated in the channel. Thus, another achieved advantage is that one particular size of channel and handle may be used for cartridge devices of several different lengths, without the channel projecting out under the front edge of the cartridge device in the case of short cartridge devices.

BRIEF DESCRIPTION OF THE DRAWINGS

In the following, the invention will be explained in more detail by means of examples of embodiments with reference to the schematic drawings, in which FIGS. 1 to 5 constitute orthogonal views of a link in accordance with an embodiment of an articulated driving mechanism according to the invention, FIG. 6 is a perspective view of the link mechanism of FIGS. 1 to 5, FIGS. 7 and 8 are perspective views of an embodiment of the driving mechanism of the invention, FIGS. 9 and 10 constitute orthogonal views of the driving mechanism of FIGS. 7 and 8, FIG. 40 is a perspective view of the link mechanism of FIGS. 35 to 39, FIGS. 41 to 44 constitute orthogonal views of an embodiment of a link pin for application with the links of the articulated driving mechanism according to the invention shown in FIGS. 35 to 40.

In the following, corresponding members will be referred to using the same reference numerals, as far as possible.

DETAILED DESCRIPTION OF THE DRAWINGS

Figure 11:
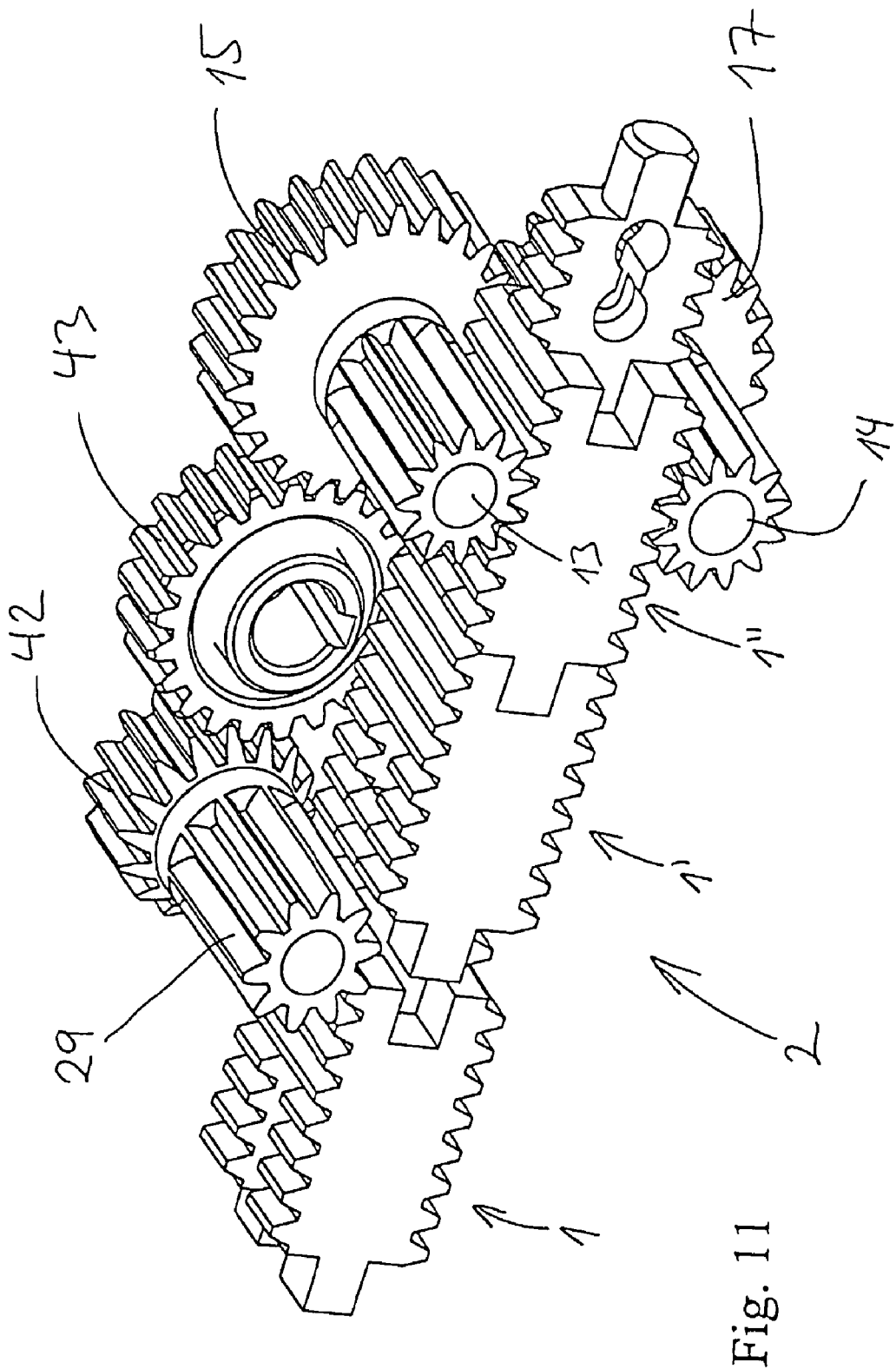
FIG. 11 is a perspective view of the driving mechanism of FIGS. 7 to 10, placed in a conveyor mechanism thereof.

FIGS. 1 to 6 show a single rigid link 1 of the type of which three links 1, 1', 1" are connected to form a driving mechanism 2 in accordance with the invention, as shown in FIGS. 7 to 10. The link 1 is integrally formed, for example, by injection moulding polyacrylamide with approximately 50% fibreglass-reinforcement. However, the link 1 may be made of any suitable material and in any suitable manner. The link 1 has a substantially quadratic cross section and has two longitudinal opposing tooth surfaces 3, 4. Furthermore, the link 1 has two longitudinal opposing lateral faces 5, 6. At the end of the link 1 located to the left in FIGS. 1 to 3, it is formed as a male part 7 in the form of a flange 8 projecting longitudinally relative to the link and in parallel with the lateral faces 5, 6. At the end of the link 1 located to the right in FIGS. 1 to 3, it is formed as a female part 9 in the form of two projecting flanges 10, 11 separated by a slot 12. The flanges 10, 11 extend longitudinally relative to the link 1, so that they are in parallel with the flange 8 and each flushes with the opposing lateral faces 5, 6 of the link 1. As shown in FIGS. 7 to 10, several links 1 of the above mentioned type may be connected to form a driving mechanism 2 by inserting the flange 8 of a first link 1 between the flanges 10, 11 of a second link 1'.

Figure 14:
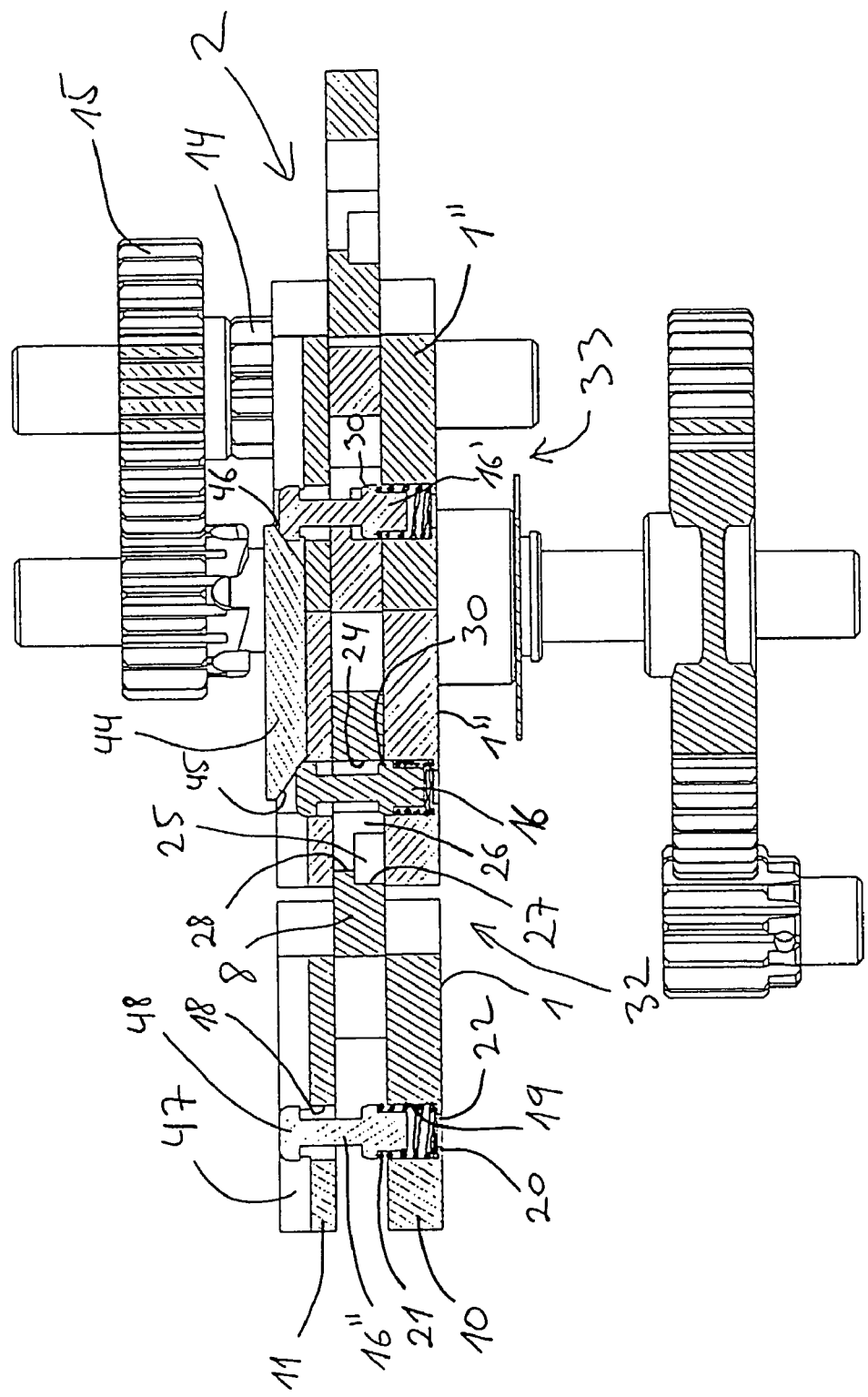
FIGS. 14 to 16 show the driving mechanism of FIG. 11, in a top view in horizontal section, in three different positions, respectively, when advancing the links.
Figure 15:
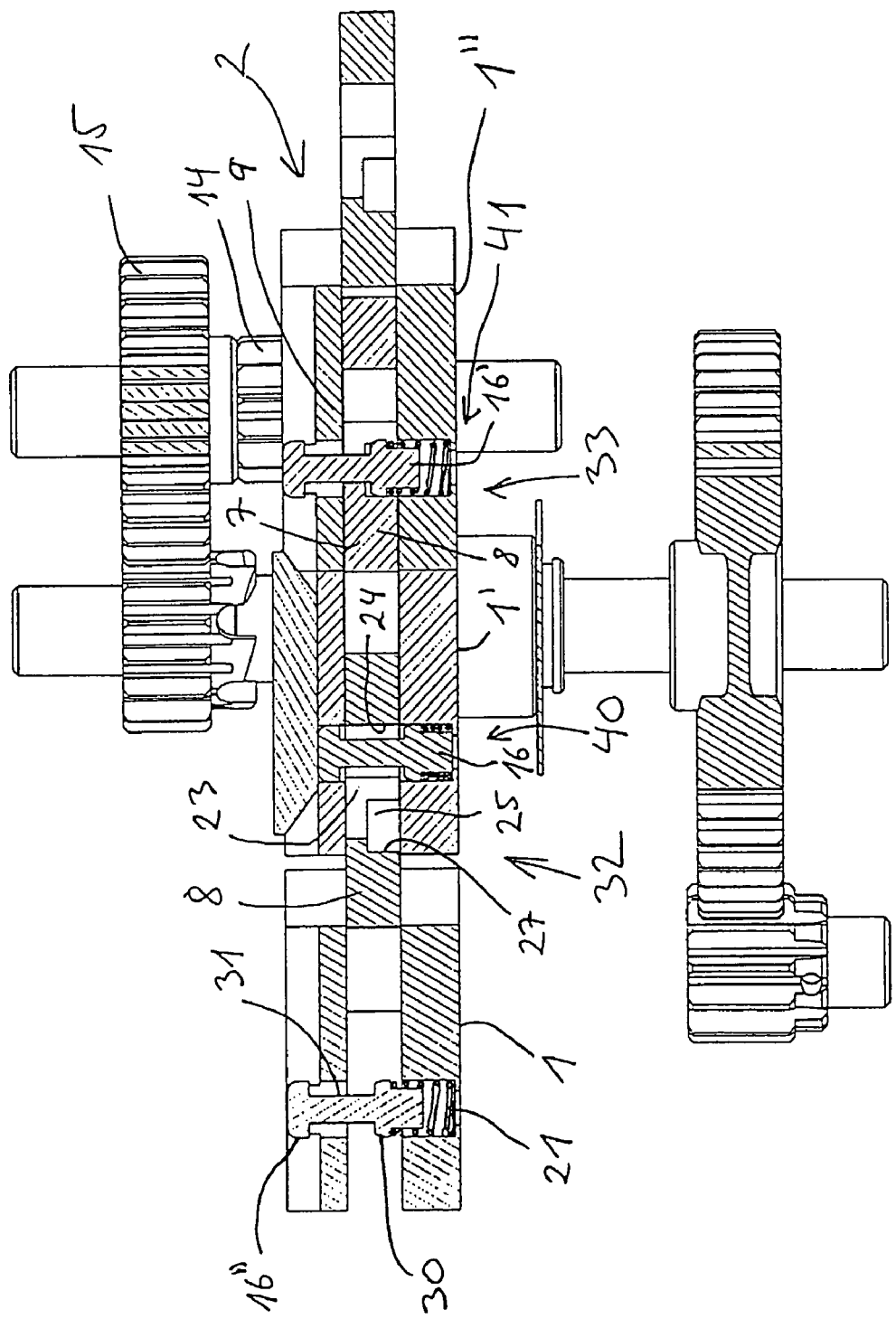
Figure 16:
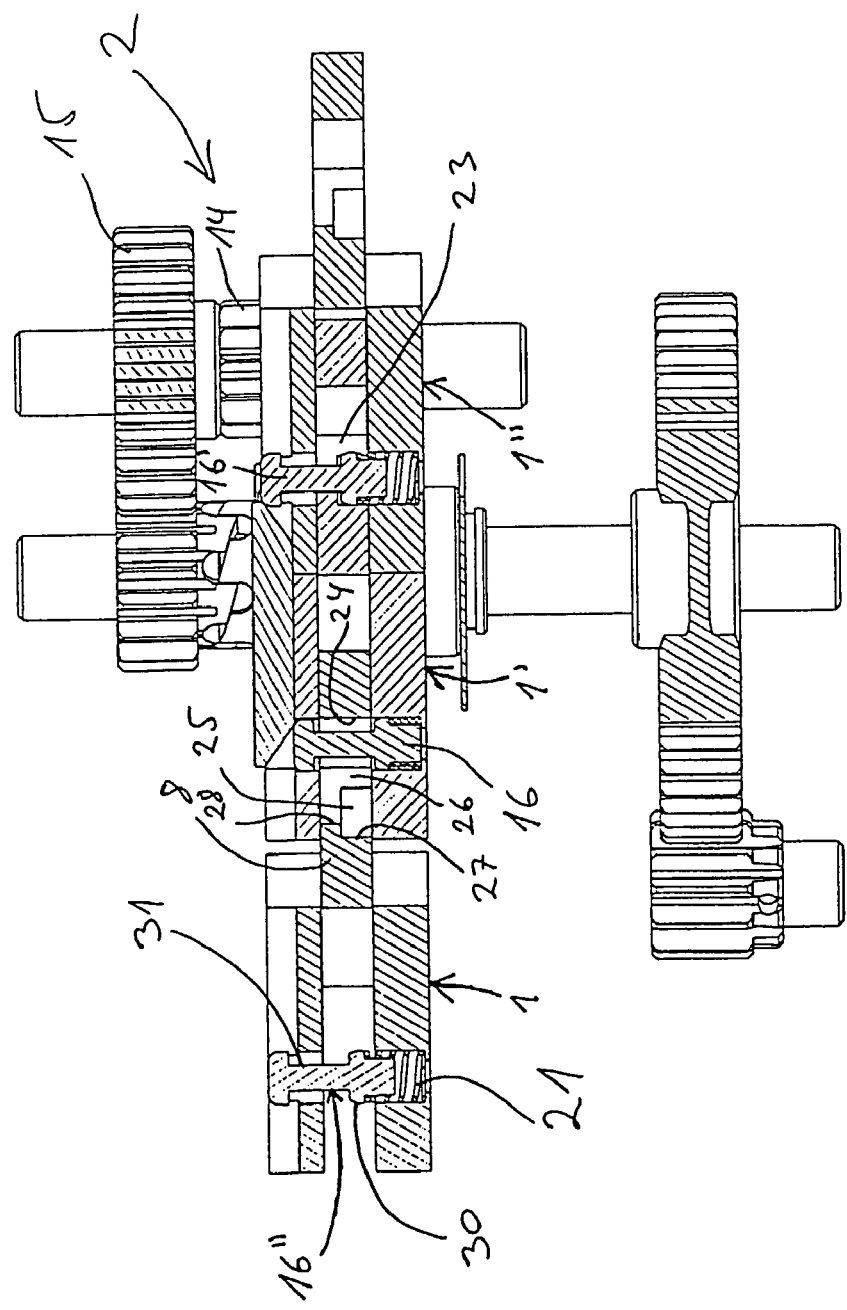

Referring to FIGS. 7 and 8, the links 1, 1', 1" are held together by means of respective link pins 16, 16', which, in the female part of the links 1, 1', 1", are arranged partly in a first cylindrical hole 18 formed transversely relative to the flange 11 and partly in a second hole 19 formed transversely relative to the flange 10, see FIGS. 14 to 16. The first cylindrical hole 18 opens into a longitudinal groove 47 of the link 1. As shown, the hole 19 has a bottom 20, so that the pin 16, 16', 16" and an intermediate compression spring 21 may be retained in the hole 19. At the bottom 20, a smaller hole 22 is formed for manufacturing reasons. In the male part 7 of the link 1, 1', 1", the pin 16, 16' is arranged in an elongated hole 23, the longitudinal axis of which extends in the longitudinal direction of the link, and which is composed of a first cylindrical hole 24 and a second cylindrical hole 25, these two holes 24, 25 being connected by a slot 26. The second cylindrical hole 25 has a first section 27 with a diameter corresponding to that of the first cylindrical hole 24 and a second section 28 with a diameter, which is smaller than the diameter of the first section 27 and equals the width of the slot 26.

Referring to FIG. 16, the link pin 16, 16', 16" has a first section 30 with a diameter, which is slightly smaller than the diameter of the first cylindrical hole 24 and the diameter of the first section 27 of the second cylindrical hole 25 of the flange 8, so that the first section 30 of the link pin is just able to slide into the cylindrical holes 24, 25, and yet be positioned with a good accuracy in the holes. Furthermore, the link pin 16, 16', 16" has a second section 31 with a diameter, which is so large that the section 31 just fits into the slot 26 and also into the second section 28 of the second cylindrical hole 25.

Referring to FIGS. 7, 8, 10 and 15 in particular, it is shown that two adjacent links can be held together by the link pin 16, 16', 16", either in a first position 32, in which the links 1, 1' are pivotal in relation to one another about the axis of the link pin 16, or a second position 33, in which the male part 7 and the female part 9 are completely pressed together, so that the links 1', 1" are unable to pivot in relation to one another and together form a rigid piece of a toothed rack.

Additionally, it should be noted that, in the second position of two adjacent links, a cylindrical stud 34 projecting from the free end of the flange 8 of the male part 7 engages tightly with a corresponding cylindrical hole 35 of the female part 9 between its flanges 10, 11, see FIGS. 2 and 4. Furthermore, studs 36, 37 projecting from the free ends of the flanges 10, 11 of the female part 9 engage tightly with corresponding recesses 38, 39 at either side of the flange 8 in the lateral faces 5, 6 of the link. This ensures a further good engagement between two adjacent links in their second locked position.

Referring to FIG. 15, the link pin 16, 16' can assume a first position 40, in which the adjacent links are displaceable from their first pivotal position 32 to their second locked position 33, and a second position 41, in which the adjacent links are locked against displacement in relation to one another, respectively. In the first position 40 of the link pin, the compression spring 21 is compressed, so that the second, thin section 31 of the pin is located in the elongated hole 23, so that the pin is displaceable in the longitudinal direction of the elongated hole. In the second position 41 of the pin, its first, thick section 30 is located in one of the cylindrical holes 24, 25 of the flange 8. In FIG. 15, the pin 16' at the right-hand side is arranged with its first section 30 in the first section 27 of the second cylindrical hole 25, which is closest to the centre of the link, so that the male part 7 and the female part 9 are completely pressed together and locked in relation to one another in their second position. Referring now to the pin 16 located at the centre in FIG. 14, it is shown that it is on its way to its second position in the first cylindrical hole 24 of the flange 8, so that the two adjacent links in question are locked in their first position 32, in which the links are pivotal in relation to one another. This takes place by means of the first thick section 30 of the pin 16 sliding into the cylindrical hole 24 and thereby locking the pin 16 against trans-verse displacement in the elongated hole 25, because the slot 26 connecting the two cylindrical holes 24, is narrower than the diameter of the hole 24. When it reaches its second position, the pin 16 will have been lifted all the way up by the compression spring 21, so that it is located in a position corresponding to that of the pin 16" in FIG. 14.

Figures 12, 13:
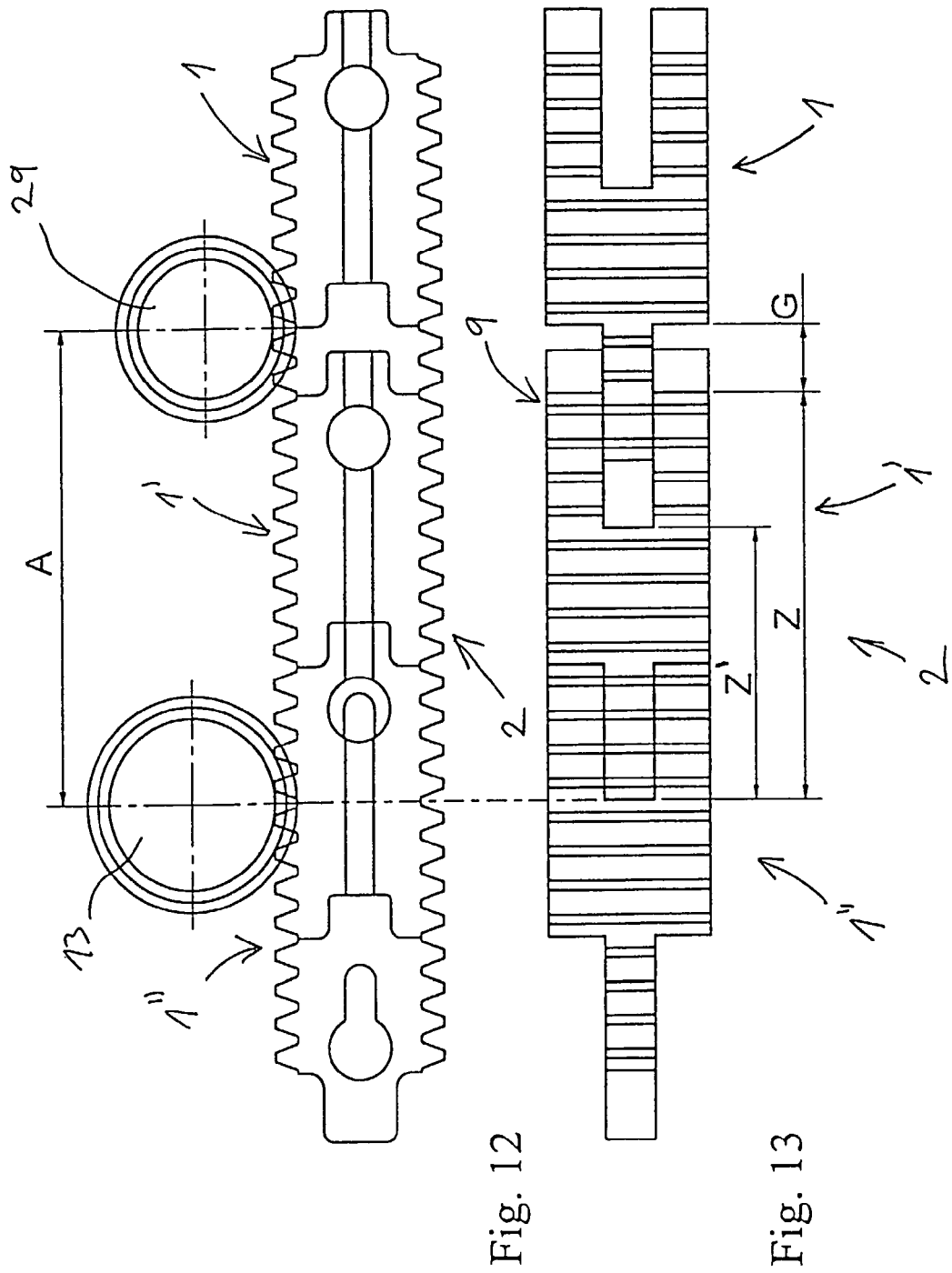
FIGS. 12 and 13 are schematic illustrations of the driving mechanism of FIG. 11, in side and top views, respectively.

FIGS. 11 to 16 show the driving mechanism 2 of the invention, placed in a conveyor mechanism, by means of which the pairs of adjacent links of the driving mechanism may be displaced one by one in relation to one another between their first, mutually pivotal position and their second, mutually locked position. It should be noted that the driving mechanism 2 of FIGS. 12 and 13 is shown in an inverted manner in relation to the driving mechanism of the other figures just mentioned, so that the right-hand and left-hand ends, respectively, of the driving mechanism shown in the figures have been switched around, which also appears from the reference numerals. The link 1" located to the right in FIG. 11 is arranged between two toothed wheels, namely an upper, first driving wheel 13 and a lower, second driving wheel 14. The first driving wheel 13 is journaled on the same shaft as and driven by a first wheel 15 located in front, and the second driving wheel 14 is journaled on the same shaft as and driven by a second wheel 17 located in front and engaging with the first wheel 15 located in front.

As shown in FIG. 1, and also in FIG. 11, the tooth profiles of the respective opposing tooth surfaces 3, 4 of the links 1, 1', 1" of the driving mechanism are slightly displaced in relation to one another. This enables the first driving wheel 13 and the first wheel 15 located in front to be made as an integral pair and the second driving wheel 14 and the second wheel 17 located in front to be made as an integral pair and completely identical with the pair of the first driving wheel 13 and the first wheel 15 located in front. This facilitates manufacturing. Because the first wheel 15 located in front and the second wheel 17 located in front are mutually engaging, their tooth profiles are always displaced in relation to one another, and if said two pairs of toothed wheels 13, 15, 14, 17 are identical, the tooth profiles of the first driving wheel 13 and the second driving wheel 14, respectively, will also be displaced in relation to one another, and therefore the tooth profiles of the respective opposing tooth surfaces 3, 4 of the links of the driving mechanism are also mutually displaced. The tooth profiles of the tooth surfaces 3, 4 may be displaced by a mutual distance corresponding to half the pitch, but the displacement may advantageously be smaller, thus avoiding backlash, because the tooth surfaces are then pressed slightly against one another. Of course, the tooth profiles of the tooth surfaces 3, 4 need not be mutually displaced, because said two pairs of toothed wheels 13, 15, 14, 17 may simply be formed with different mutual pivoting between the wheels 13, and the wheels 14, 17, respectively. In addition, it is also possible for the tooth profiles of the tooth surfaces 3, 4 to be different from one another, for example, one tooth profile may have a pitch equaling twice the pitch of the other tooth profile. The two driving wheels 13, 14 may also have correspondingly different tooth profiles.

A displacement wheel 29 is located above and in between the two mutually displaced links 1, 1', in that, when displacing the driving mechanism 2 from the left to the right in FIG. 11, the displacement wheel 29 will immediately engage with the link 1 and displace this comparatively towards the link 1', because the displacement wheel 29 is driven at a greater roll speed, i.e. tangential velocity, on its pitch circle in relation to the roll speed on the pitch circle of the first driving wheel 13. The displacement wheel 29 is journaled on the same shaft as and driven by a rearwardly located wheel 42, engaging with an intermediate wheel 43, which in turn is engaging with the first wheel 15 located in front. Clearly, it is possible to leave out one of the driving wheels 13, 14, and in that case the driving wheel in use need not be located on the same side of the driving mechanism 2 as the displacement wheel 29.

FIGS. 14 to 15 show the driving mechanism 2 in different positions displaced along its longitudinal axis in relation to the conveyor mechanism. Considering the movement of the driving mechanism 2, from the position shown in FIG. 14 to that in FIG. 15, it appears that the link pin 16 is displaced into its first position, in which it is displaceable in the elongated hole 23 of the link 1. This takes place by means of a stationary ramp in the form of a plate-like member 44 with oblique end edges 45, 46. The plate-like member 44 is stationary in relation to the conveyor mechanism, and the links 1, 1', 1" are guided by the member 44, in that it slides into the longitudinal slot 47 of the links.

Since the link pins 16, 16', 16" having an enlarged head 48 project into the slot 47, in the second position of the pin, in which it is not transversely displaceable, the pin will be pressed down-wards against the spring loading from the compression spring 21, when passing by the plate-like member 44, in that the enlarged head 48 slides along the oblique end edge 45 of the plate-like member 44. In FIG. 15, the link pin 16 is in its first position, in which it is transversely displaceable in the elongated hole 23, and in this position of the pin, the adjacent links held together by the pin are displaced from their first mutually pivotal position to their second locked position, after which the link pin is in turn displaced to its second position, in that its enlarged head 48 slides up along the oblique end edge 46 of the plate-like member 44, as is the case for the link pin 16' in FIG. 14. After this, the links held together by the link pin are locked in relation to one another and form a piece of a rigid toothed rack. When displacing the driving mechanism 2 in the opposite direction, i.e. as in FIG. 11, from the right to the left, the adjacent links are displaced one by one in a corresponding manner from their mutually locked position to their first mutually pivotal position.

FIGS. 35 to 40 show views, corresponding to FIGS. 1 to 6, of another embodiment of a link 96, which may be combined to form a driving mechanism 97 according to the invention, see FIGS. 46 to 51. The link 96 differs from the link shown in FIGS. 1 to 6 in that it is constructed to be connected with adjacent links by means of a link pin 98 shown in FIGS. 41 to 45. Like the link 1 described above, the link 96 has a male part in the form of a flange 99 and a female part in the form of two spaced apart flanges 100, 101. In the flange 99, an elongated hole 102 is formed, composed of two equal cylindrical holes 103, 104 connected by a slot 105, which is narrower than the diameter of the cylindrical holes 103, 104. The elongated hole 102 has a uniform cross section all the way through the flange 99. The link pin 98 has a cylindrical body 106 with a disc-shaped head 107. The body 106 has a locking section 108, which, in the driving mechanism 97 shown in FIGS. 46 to 51 composed of several links 96, is located in the elongated hole 102 of the link 96, said locking section 108 having recesses 109 formed diametrically opposite in the body 106. Each recess 109 has a flat bottom 110, where the respective bottoms 110 of the two opposite recesses are flat and are placed in parallel with a distance, which is slightly smaller than the width of the slot 105 of the elongated hole 102 in the link 96. In this way, in a position in which the bottoms 110 of the recess 109 are substantially parallel to the sides of the slot 105, the pin 98 is displaceable between the two cylindrical holes 103, 104, and in other positions, in which the pin 98 is pivoted about its axis in relation to the above-mentioned position, it is retained in one of the two cylindrical holes 103, 104.

In the mounted position of the pin 98 in the link 96, as shown in FIGS. 46 to 51, the disc-shaped head 107 of the pin is located in a corresponding substantially circular recess 111 on the exterior of one of the flanges 101 of the female part of the link 96. The body 106 of the link pin 98 runs from the head 107 through a cylindrical hole 112 in the flange 101 of a first link 96 of a pair of adjacent links, and then through an elongated hole 102 in a second link 96' of said adjacent pairs of links, and finally through a cylindrical hole 113 in the flange 100. At its end located opposite the head 107, the link pin 98 has diametrically opposite resilient flanges 114, which engage under the edge of the hole 113, in the mounted position of the pin, and thereby retains the pin in the mounted position.

Figure 42:
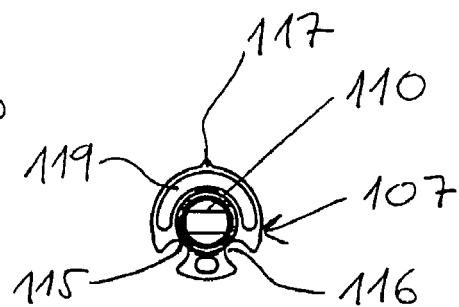
Figure 43:
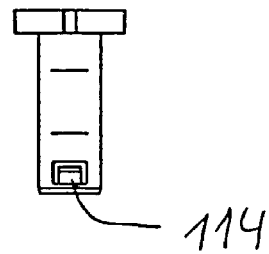

As best shown in FIG. 42, the disc-shaped head 107 of the link pin 98 has two spaced apart indentations 115, 116, which, seen in relation to the longitudinal axis of the link pin, are spaced apart by a 90° space, symmetrically on either side of a plane, running through the longitudinal axis of the link pin and perpendicular to the bottoms 110 of the recesses 109 in the body 106 of the link pin 98. Diametrically opposite the space between said two indentations 115, 116, the head 107 has a latch means in the form of a projection 117, which, in the mounted position of the pin, can engage with one of several corresponding indentations 118 formed with a 90° space at the periphery of the substantially cylindrical recess 111 in the flange 101 of the link 96. In the head 107 of the link pin 98, along the periphery of the head, opposite the indentations 115, 116, a through arcuated recess 119 is formed. By forming this recess 119 with a suitable width, a suitable spring power of the projection 117 can be achieved.

FIGS. 46 to 51 show a sequence of views showing a driving mechanism 97 according to the invention composed of three links 96, 96', 96", as shown in FIGS. 35 to 40, when advancing the driving mechanism from the right to the left in the figures. Figures designated A show the driving mechanism 97 from the side, on which the heads 107 of the link pins 98 are visible, Figures B show the driving mechanism of Figures A in a top view, and Figures C show the driving mechanism of Figures A in a rear view, but in section so that the locking sections 108 of the link pins 98 are visible. The Figures designated D show the driving mechanism in a perspective view.

FIGS. 46 to 51 show two spaced apart stationary studs 120, 121, which, when advancing the driving mechanism 97, project into a groove 122 running along one of the lateral faces of the links of the driving mechanism and thereby connect the recesses 111, in which the link pin heads 107 are placed. It should be noted that for manufacturing reasons the links 96 are made symmetrically, so that each one of two opposing sides of the links is provided with two parallel grooves 122, although only one out of a total of four of these grooves is used.

Figure 46:
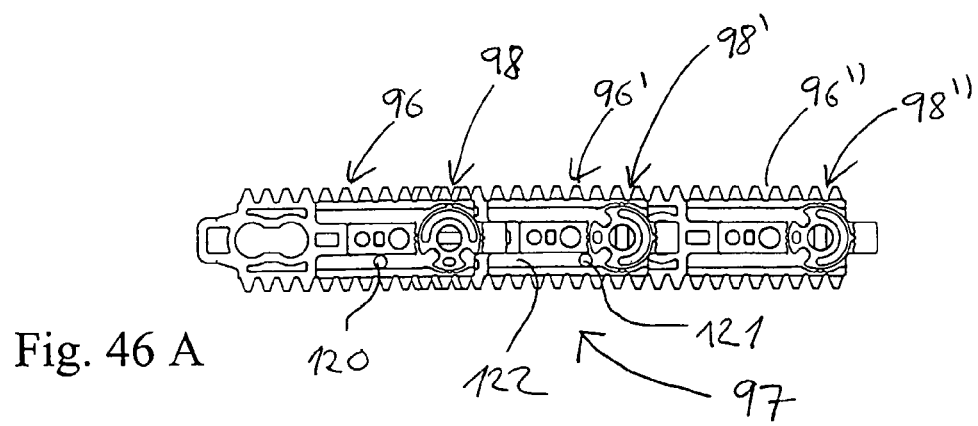
Figure 46:
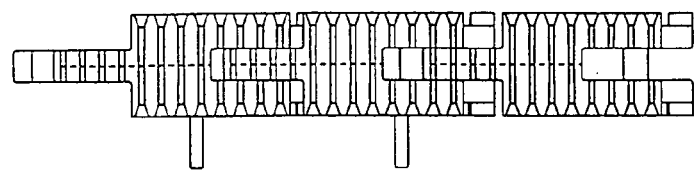
Figure 46:
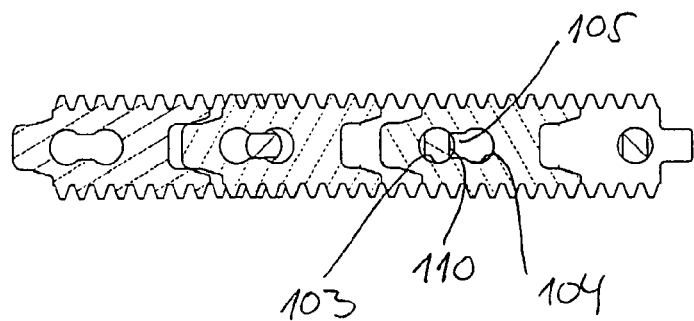
Figure 46:
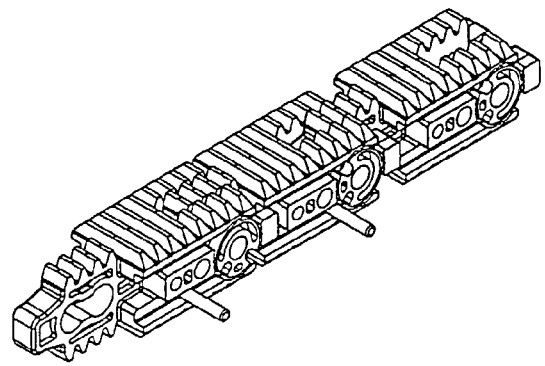
Figure 47:
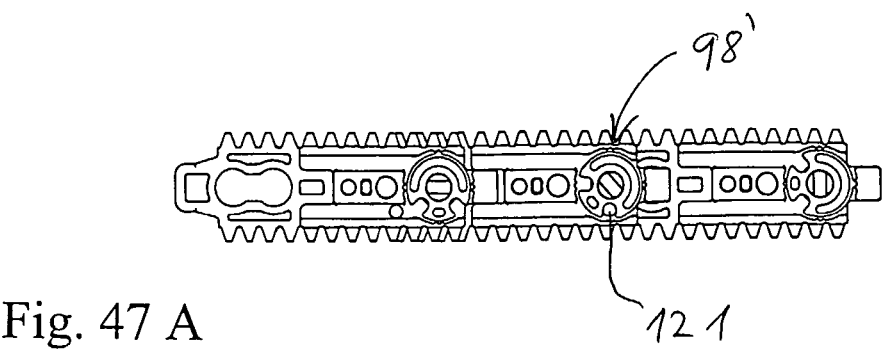
Figure 47:
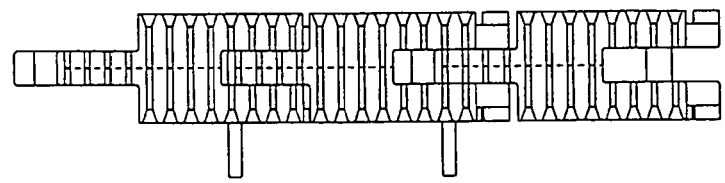
Figure 47:
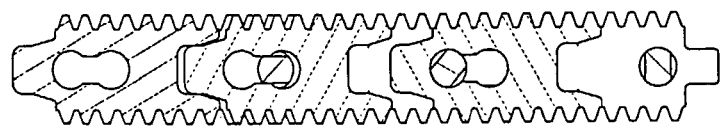
Figure 47:
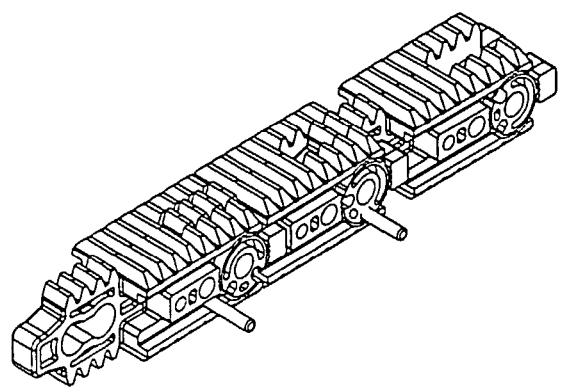
Figure 48:
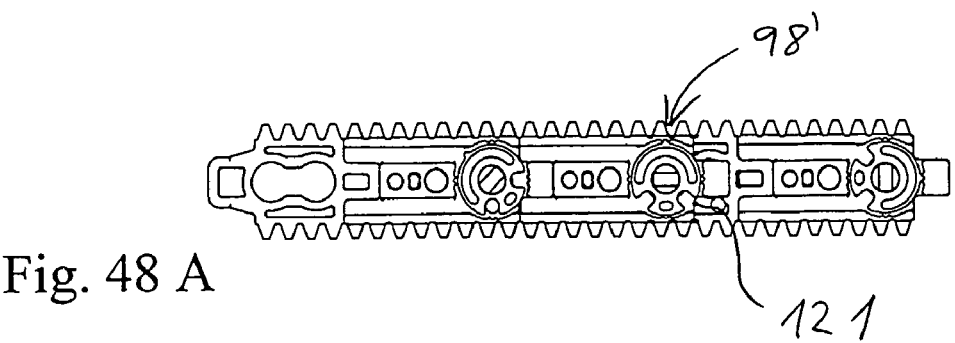
Figure 48:
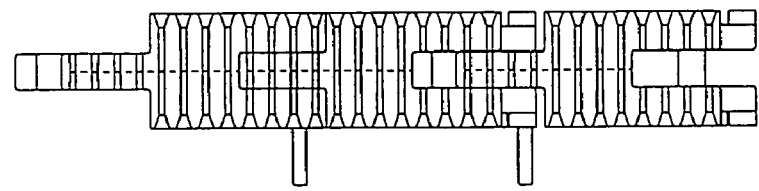
Figure 48:
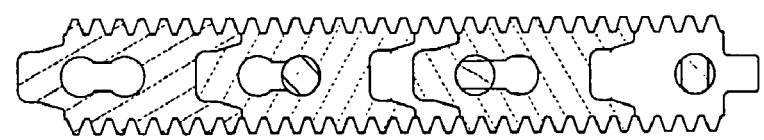
Figure 48:
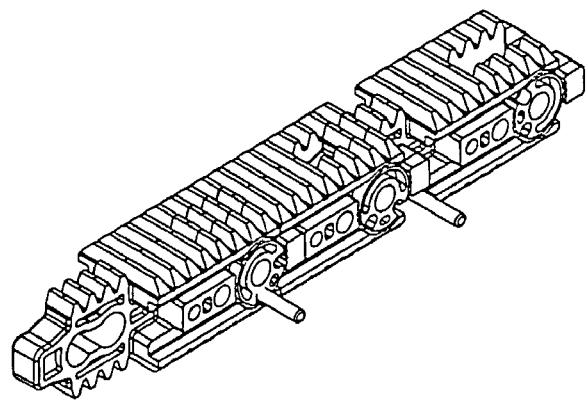
Figure 49:
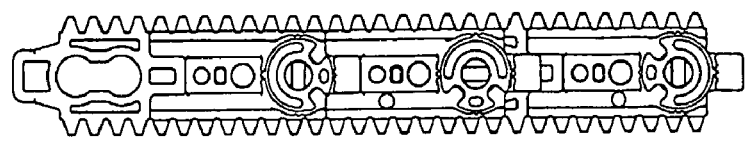
Figure 49:
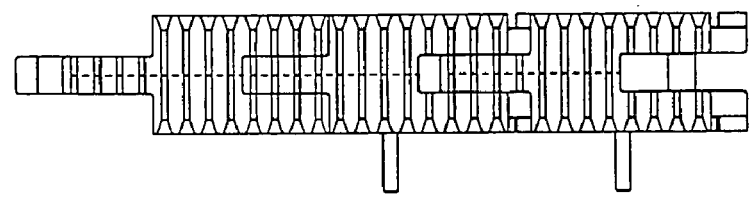
Figure 49:
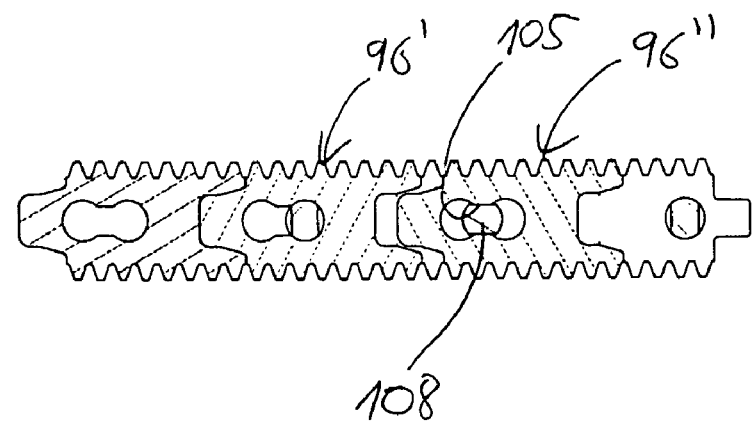
Figure 49:
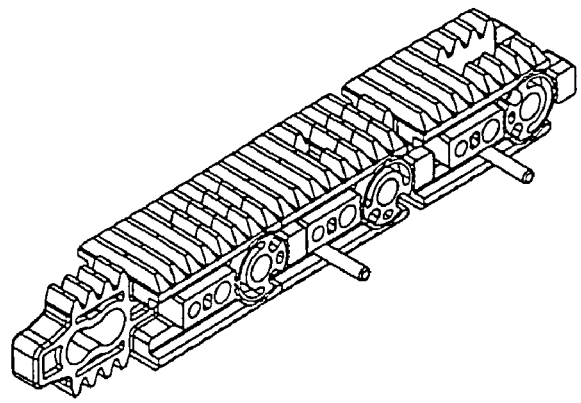
Figure 51:
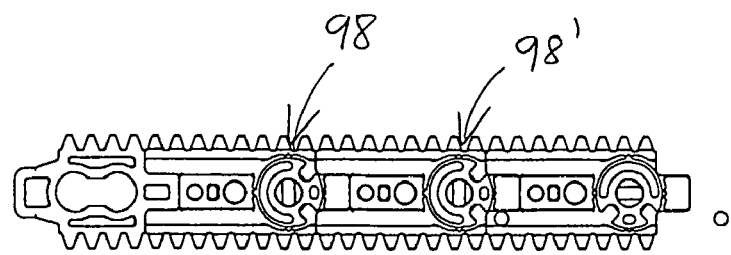
Figure 51:
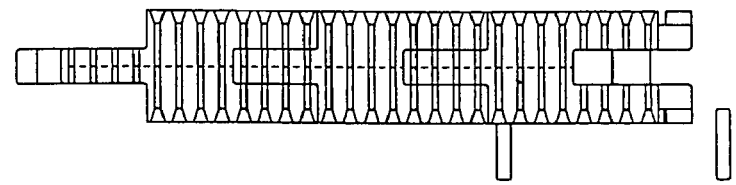
Figure 51:
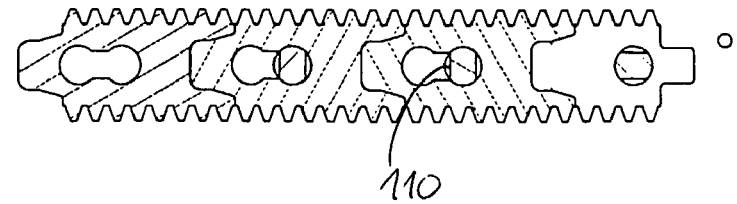
Figure 51:
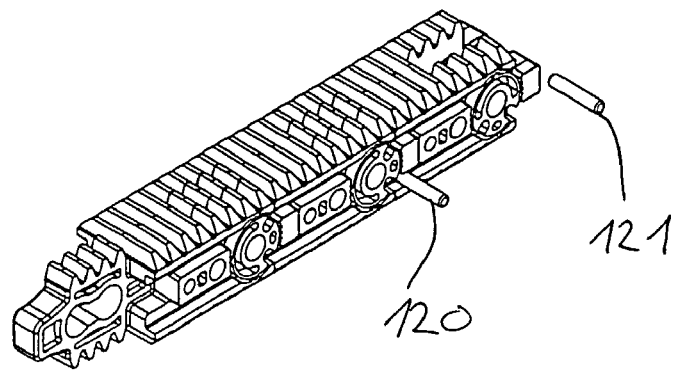

FIG. 46 shows that the links 96', 96" are held together by the link pin 98' in their first position, in which the adjacent links are pivotal in relation to one another about the axis of the link pin, where the link pin is pivoted in such a manner that the bottoms 110 of the recesses 109 are perpendicular to the slot 105 connecting the two cylindrical holes 103, 104 of the elongated hole 102. In FIG. 47, the driving mechanism 97 has moved slightly to the left, whereby the stationary stud 121 has pivoted the link pin 98' slightly counter-clockwise, and in FIG. 48 the driving mechanism has been displaced further to the left, so that the stud 121 has pivoted the link pin 98' to such an extent that the bottoms 110 of the locking section 108 of the link pin 98 are parallel to the slot 105 of the elongated hole 102. In FIG. 49, the driving mechanism 97 has been displaced further to the left, whereby the links 96', 96" have been displaced slightly towards one another, so that the locking section of the link pin 108 is located in the slot 105. In FIG. 50, the driving mechanism has been displaced to such an extent to the left that the links 96', 96" have been displaced into their second position, in which they are locked against pivoting in relation to one another, and the link pin 98 is located in the cylindrical hole 104 closest to the centre of the link 96". At the same time, the locking section 108 of the stationary stud 120 has been pivoted to such an extent that the adjacent links 96', 96" are locked in their second position. In FIG. 51, the link pin 98' has been pivoted to such an extent that the bottoms 110 of the locking section 108 are perpendicular to the slot 105. The embodiment of the link mechanism 97, shown in FIGS. 35 to 40 as well as in FIGS. 46 to 51, is advantageous because the links 96 may be connected by means of only one part, i.e. the link pin 98, which is merely pushed through the corresponding holes of two connected adjacent links, until the resilient flanges 114 engage at the edge of the hole 113 of the flange 100.

Figure 17:
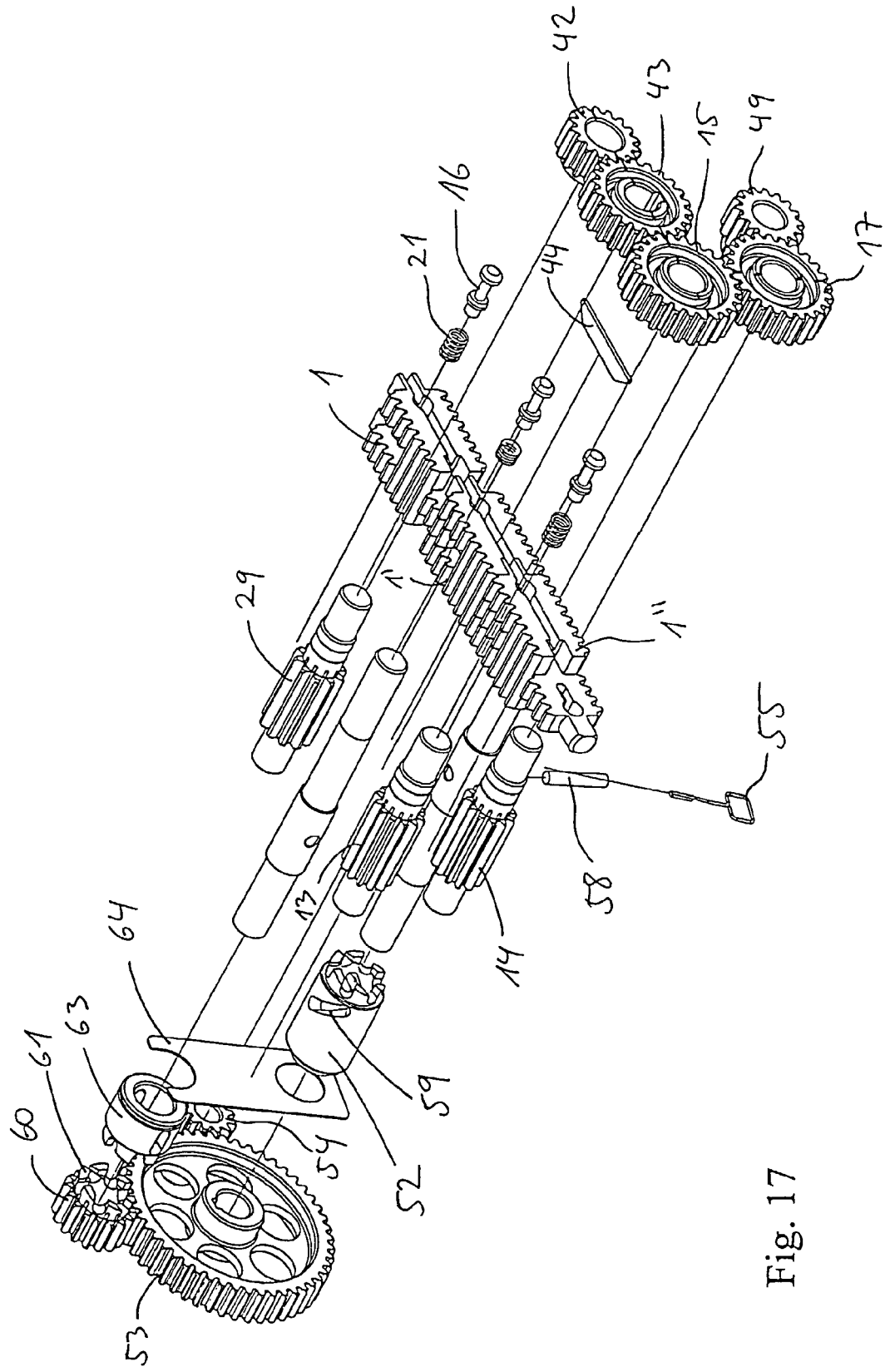
FIG. 17 is an exploded view of an embodiment of the driving mechanism of the invention, in an oblique top and front view.
Figure 18:
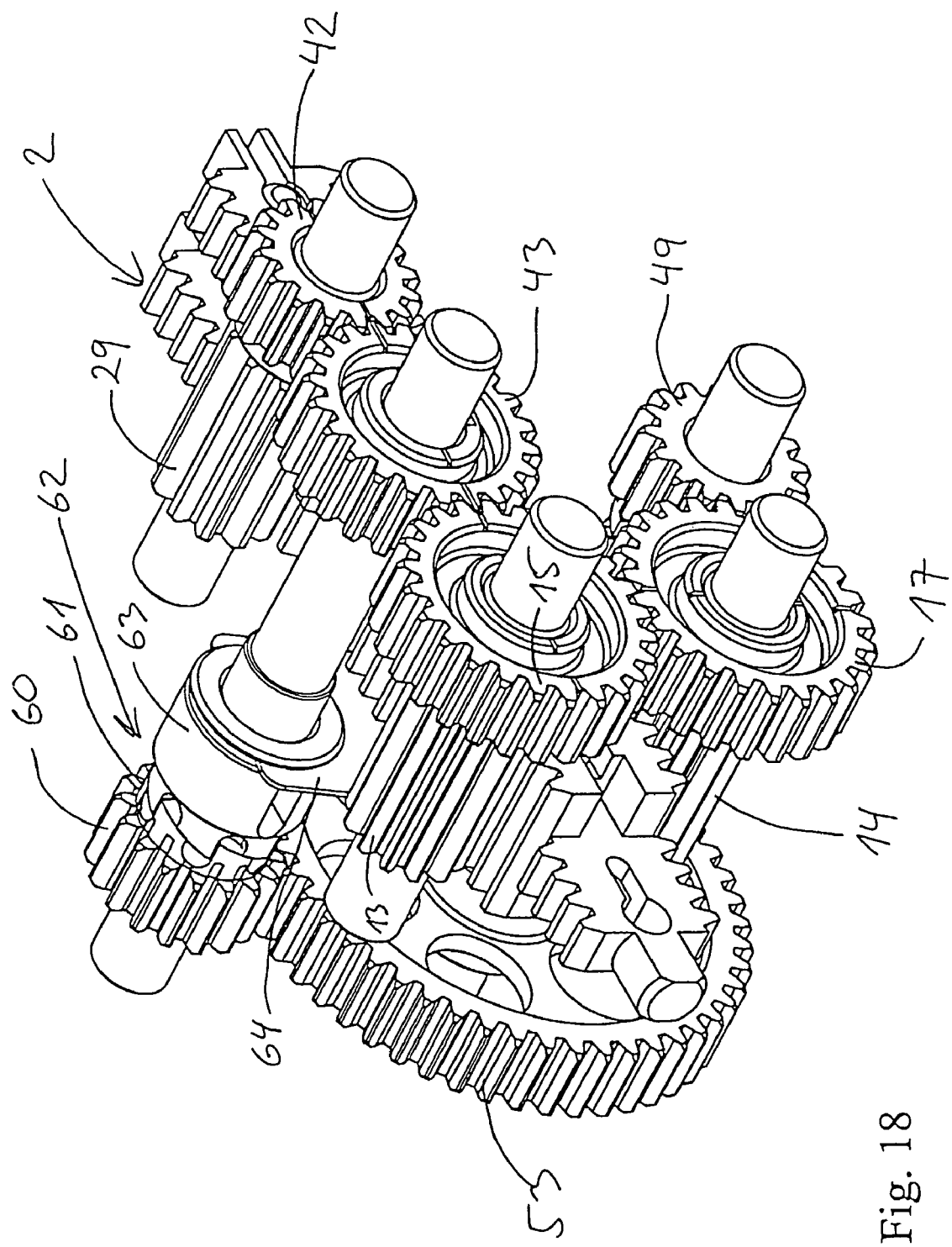
FIG. 18 is a perspective view of the driving mechanism of FIG. 17, in an oblique top and front view.
Figure 19:
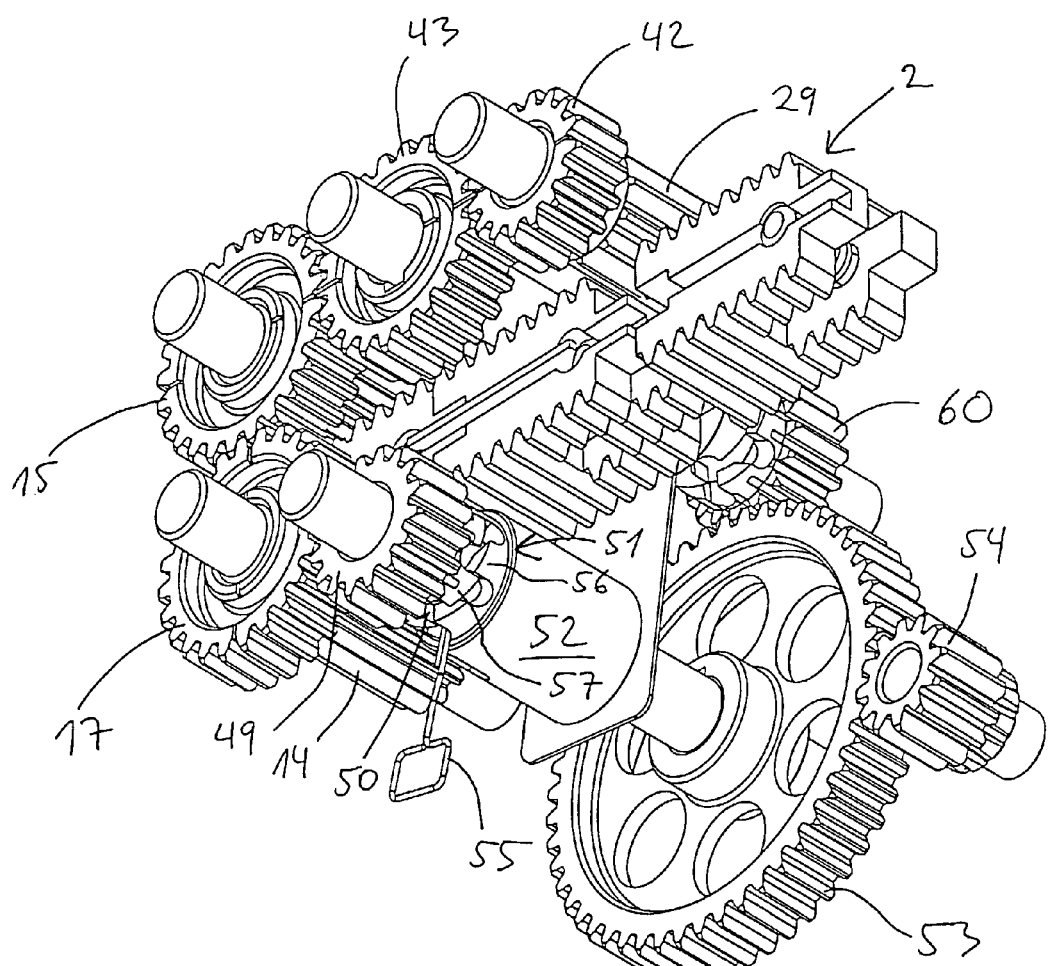
FIG. 19 is a perspective view of the driving mechanism of FIGS. 17 and 18, in an oblique rear and bottom view.
Figure 20:
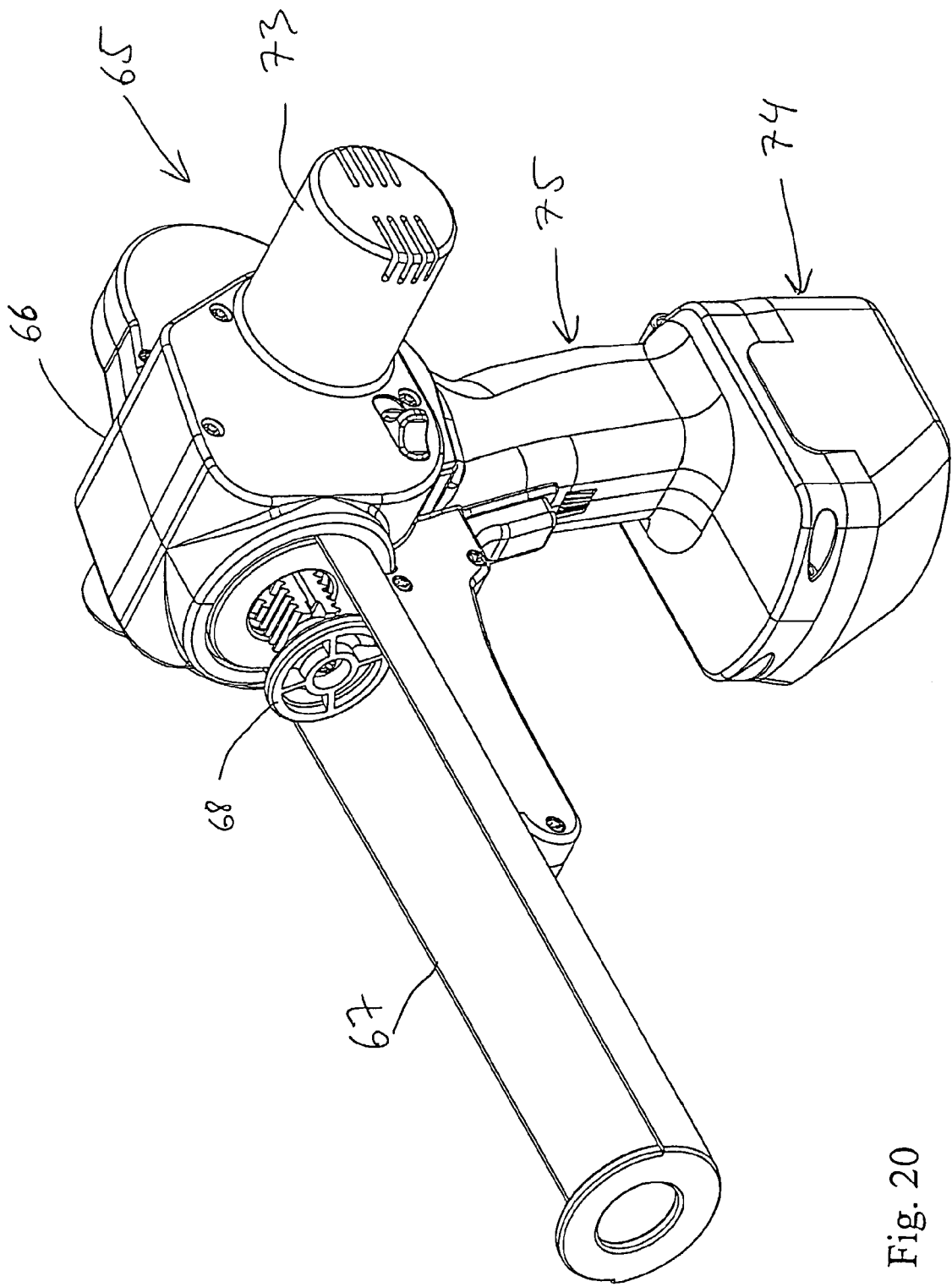
FIG. 20 shows an embodiment of a dispenser comprising a driving mechanism of the invention, in an oblique top and front view.

Referring to FIGS. 18 and 19, it is shown that the second wheel 17 located in front and driving the second driving wheel 14 is engaging with a second gear wheel 49, which is made integrally with a second part 50 of a second claw coupling 51. A first part 52 of the second claw coupling 51 can engage with the second part 50 and is positioned on the same shaft as and is driven by a large driving wheel 53, which is engaging with and driven by a motor driven toothed wheel 54, mounted on the shaft of an electric motor, not shown. The first part 52 of the second claw coupling 51 is held disengaged from the second coupling part 50 by a resilient clamp 55. An opposite end of the resilient clamp 55 is stationarily mounted. However, if the electric motor is driven with such a direction of rotation that the large driving wheel 53 rotates in a clockwise direction, as shown in FIG. 19, the first coupling part 52 is displaced along the shaft, on which it is arranged, so that tilted claws 56 on the part 52 engage with corresponding tilted claws 57 of the second coupling part 50. This displacement of the first coupling part 52 is due to the fact that the coupling part is arranged on its shaft by means of a stud 58, shown in FIG. 17, which is inserted through the shaft and arranged in an elongated hole 59, tilted relative to the shaft, of the first coupling part 52.

When the large driving wheel 53 rotates in the opposite direction, i.e. counter-clockwise in FIG. 18, the wheel drives a first gear wheel 60 formed integrally with a second coupling part 61 related to a first claw coupling 62 engaging with a first coupling part 63 of the first claw coupling 62. Via a plate member 64, the first coupling part 63 is held in engagement with the second coupling part 61 at said direction of rotation. This takes place in that the plate member 64 is also engaging with the first coupling part 52 of the second claw coupling 51, and, as mentioned above, this first coupling part 52 is held disengaged from the second coupling part 50 by means of the resilient clamp 55. The two displaceable coupling parts 52, 63 of the second and the first claw coupling, respectively, are thus displaced jointly, because they are connected by means of the plate member 64, and in this way the first and the second claw couplings are prevented from being in engagement at the same time.

The first claw coupling part 63 of the first claw coupling 62 drives the intermediate wheel 43 via a shaft. When the large driving wheel displaces the driving mechanism 2 via the first claw coupling 62, it happens relatively quickly, because of the high gear ratio between the large driving wheel 53 and the first gear wheel 60, and the driving mechanism 2 is displaced from the left to the right in FIG. 18, whereby adjacent links are displaced from one another to their first, pivotal position. In this flexible state, the driving mechanism 2 will not be affected by large forces, if it is only pushed into a housing for storage, and therefore the driving mechanism may advantageously be driven with said high gearing. On the other hand, when the large driving wheel 53 drives the driving mechanism 2 directly via its shaft via the second claw coupling 51, the driving mechanism 2 is displaced significantly slower from the right to the left in FIG. 18, whereby the adjacent links are connected in their second mutually locked position. This is practical, if the thus inflexible toothed rack is used for driving a piston, in which case far greater forces may be required than with the above mentioned opposite direction of movement. This may, for example, be the case with the dispenser described below.

FIGS. 12 and 13 illustrate how a suitable distance A between the axes of the first driving wheel 13 and the displacement wheel 29 can be calculated. When the first driving wheel 13 has displaced the link 1' the number Z' teeth forward, the displacement wheel 29 has displaced the link 1 Z'+G teeth forward, G being the mutual displacement between two adjacent link pairs in their first and second positions, respectively, measured in number of teeth. In the case shown, G equals 2. Since m is the pitch, the distance can be calculated by $$A=(Z+G)\times PI\times m,$$

where Z is the distance from the axis of rotation of the first driving wheel 13, along the driving mechanism 2, to the end of the tooth surface of the link 1' at its female part 9, as stated in FIG. 13.

In an embodiment, the displacement wheel 29 is formed having 10 teeth and being connected by means of a shaft with a rearwardly located wheel 42 having 16 teeth and being driven by an intermediate wheel 43 having 22 teeth, and the intermediate wheel is engaging with a first wheel 15 located in front having 24 teeth and being connected by means of a shaft with the first driving wheel 13 having 12 teeth.

In another embodiment, the displacement wheel 29 is formed having 16 teeth and being connected by means of a shaft with a rearwardly located wheel 42 having 24 teeth and being driven by an intermediate wheel 43 having 17 teeth, and the intermediate wheel is engaging with a first wheel 15 located in front having 30 teeth and being connected by means of a shaft with the first driving wheel 13 having 16 teeth.

In FIGS. 20 to 23, a dispenser 65 for pressing out material from a cartridge is shown. The dispenser 65 may, for example, be a caulking or glue gun. The dispenser 65 comprises a gear housing 66, on which a cartridge device 67 in the form of a so-called half pipe is mounted pivotally about its longitudinal axis on the housing 66, so that caulking or the like can easily be carried out in different positions of the dispenser.

A caulking material or glue cartridge, not shown, can be placed, in a known manner, in the cartridge device 67, and a piston 68 of the dispenser 65 can be pressed against the piston of the cartridge, so that material is dispensed from the spout of the cartridge. Alternatively, the cartridge device 67 can have the form of a substantially closed pipe, in which a bag of caulking material or the like can be placed in a known manner. Furthermore, the cartridge device 67 can have the form of a cylinder, in which the piston 68 is guided in such a manner that caulking material or the like can be sucked into the cylinder through a spout of it, when retracting the piston. In this way, the dispenser is able to use material in bulk, in a known manner, which is, for example, sucked up from a bucket.

Figure 21:
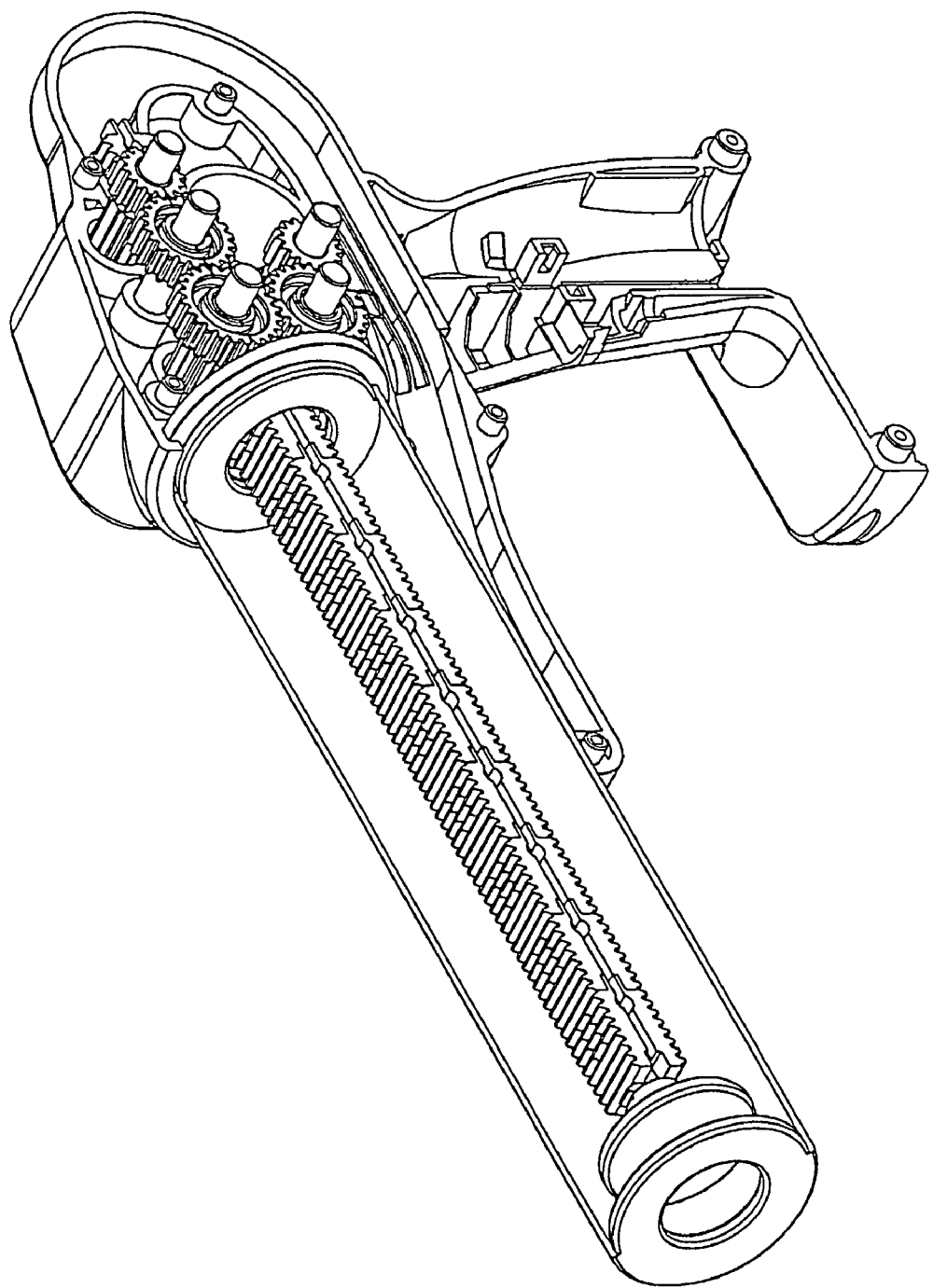
FIG. 21 is a view corresponding to FIG. 20, in which the driving mechanism has been conveyed into the cartridge device of the dispenser, and in which part of the housing has been removed.
Figure 22:
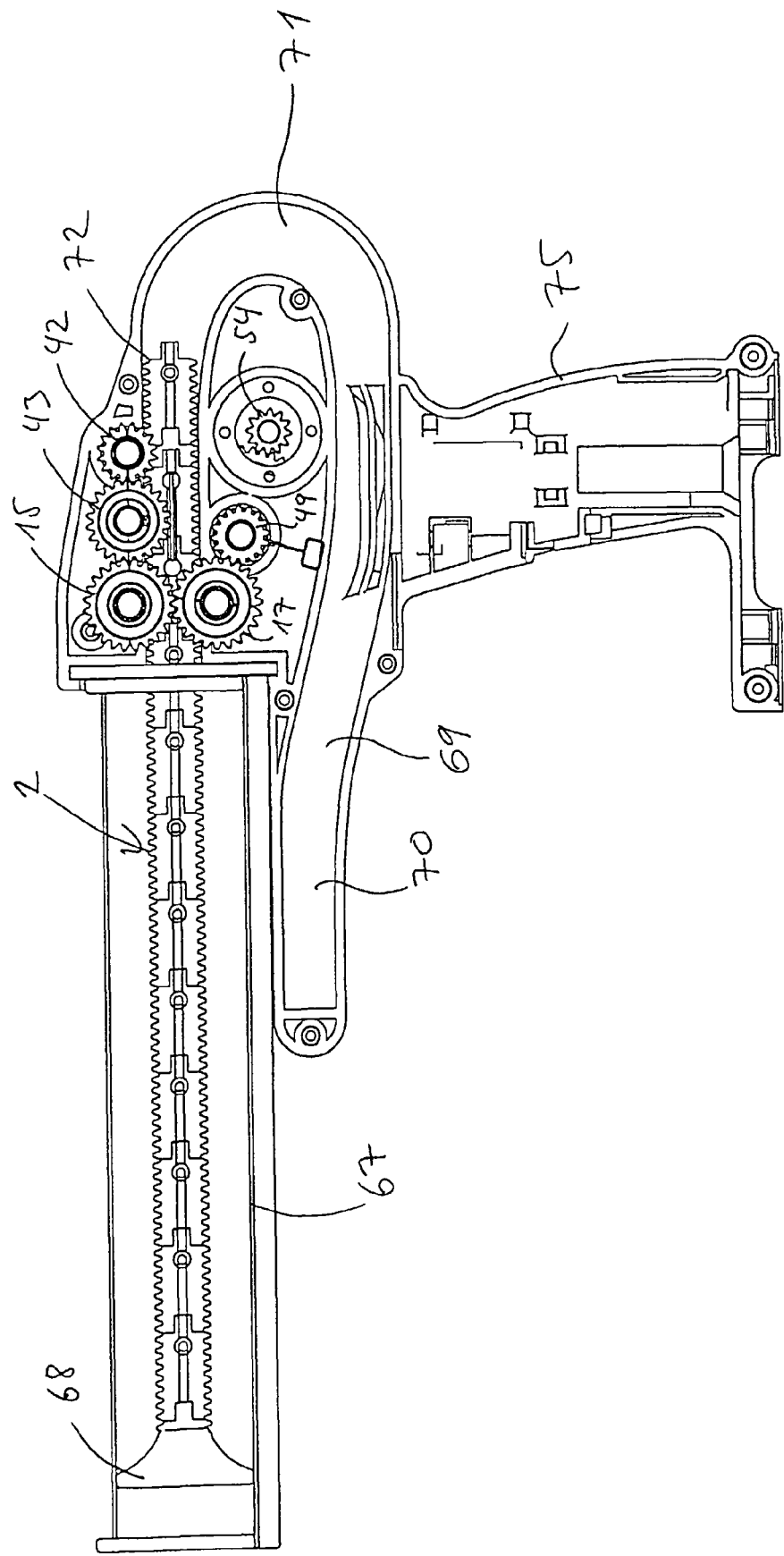
FIG. 22 is a side view of the dispenser of FIG. 21, in which part of the dispenser housing has also been removed.
Figure 23:
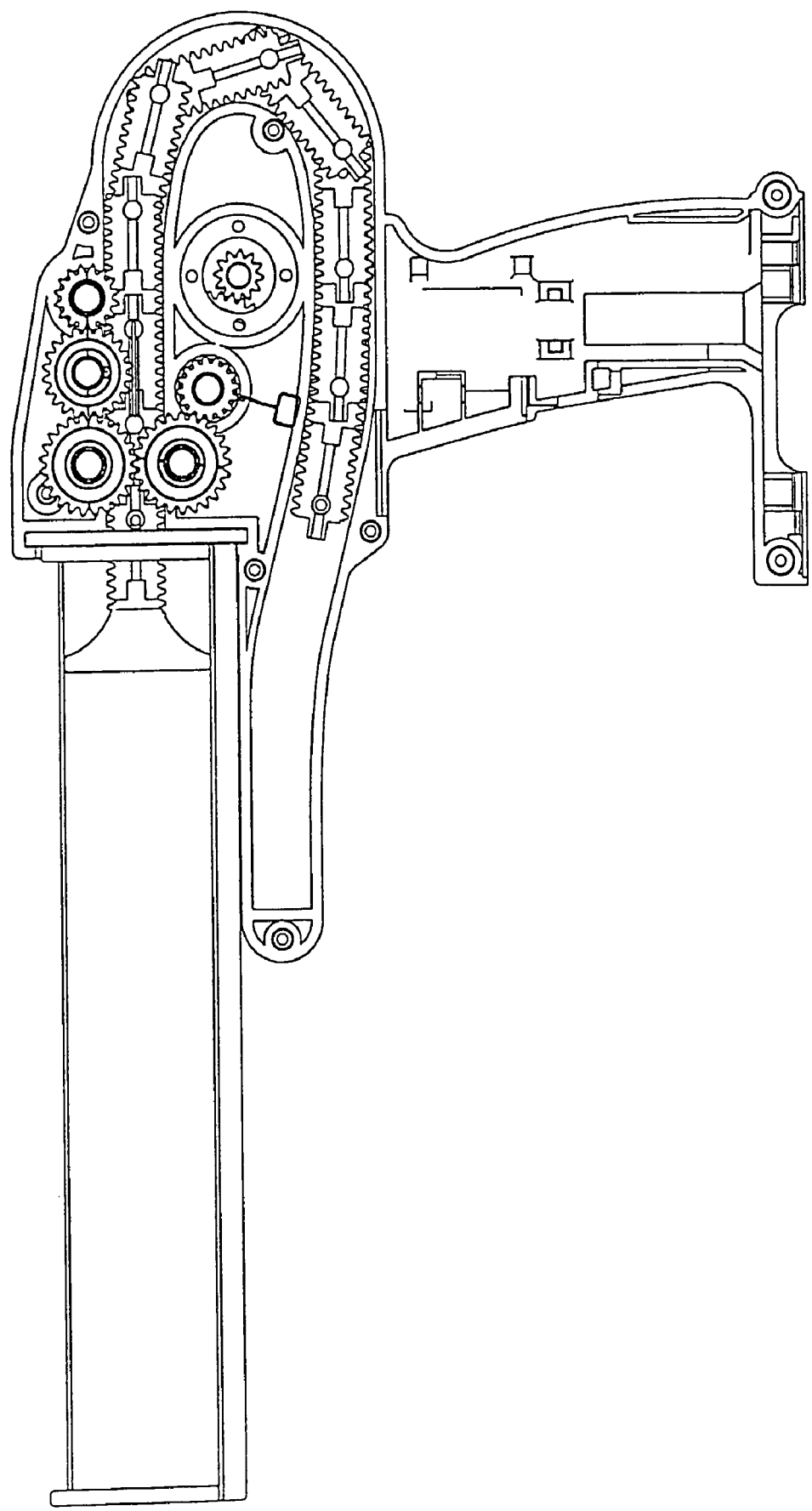
FIG. 23 is a view corresponding to FIG. 22, in which the driving mechanism has been pulled into the dispenser housing.

A driving mechanism 2 with related conveyor mechanism as described above and shown in FIGS. 18 and 19 is incorporated in the dispenser housing 66, as shown in FIGS. 21 to 23. The piston 68 is mounted on a male part 7 of an end link 1 at a first end of the driving mechanism 2, projecting from the housing 66 and into the cartridge device 67. An opposite second end of the driving mechanism is guided in a U-shaped channel 69, which has a first leg 70 curving in under the cartridge device 67 and approaching it towards the free end of the leg, so that a compact dispenser is achieved. Via an arch 71, the first leg 70 of the U-shaped channel 69 is connected with a second leg 72, extending into the conveyor mechanism described above. An electric motor, not shown, positioned in a motor housing 73, is driven by means of an accumulator, not shown, in a housing 74 placed at the bottom of a handle 75.

Figure 24:
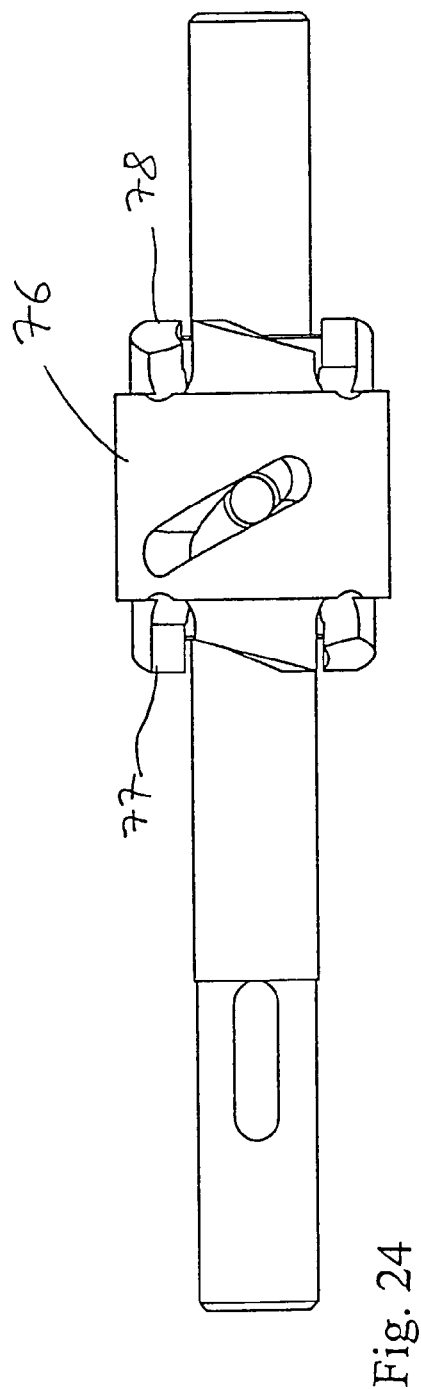
FIGS. 24 and 25 show an alternative embodiment of a coupling for application in the dispenser of FIG. 20, in side and perspective views, respectively, FIGS. 26 and 27 constitute orthogonal views of another embodiment of a link of the driving mechanism of the invention, FIGS. 28 and 29 constitute orthogonal views of a further embodiment of a link of the driving mechanism of the invention.
Figure 25:
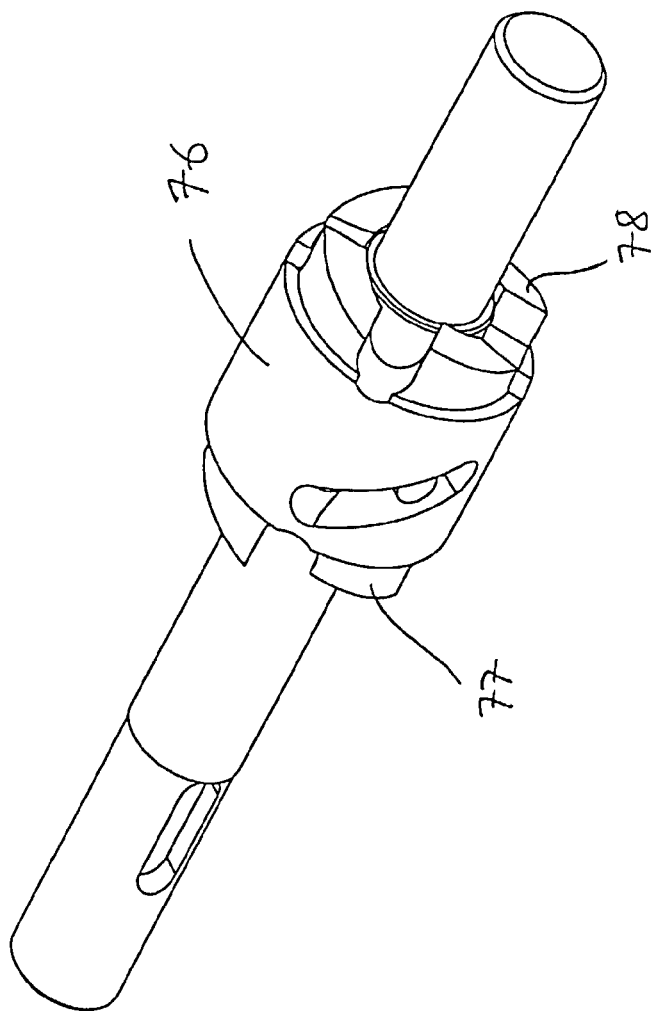

FIGS. 24 and 25 show a double-acting coupling part 76 of a double-acting claw coupling 91, which is applicable as an alternative to the two claw couplings 51, 62 described above as well as their connecting plate member 64. By means of a pin arrangement, the coupling part 76 is displaceable along its shaft just as the first coupling part 52 of the second claw coupling 51, but at its opposite ends, it is provided with a first claw part 77 and a second claw part 78, respectively.

Figure 30:
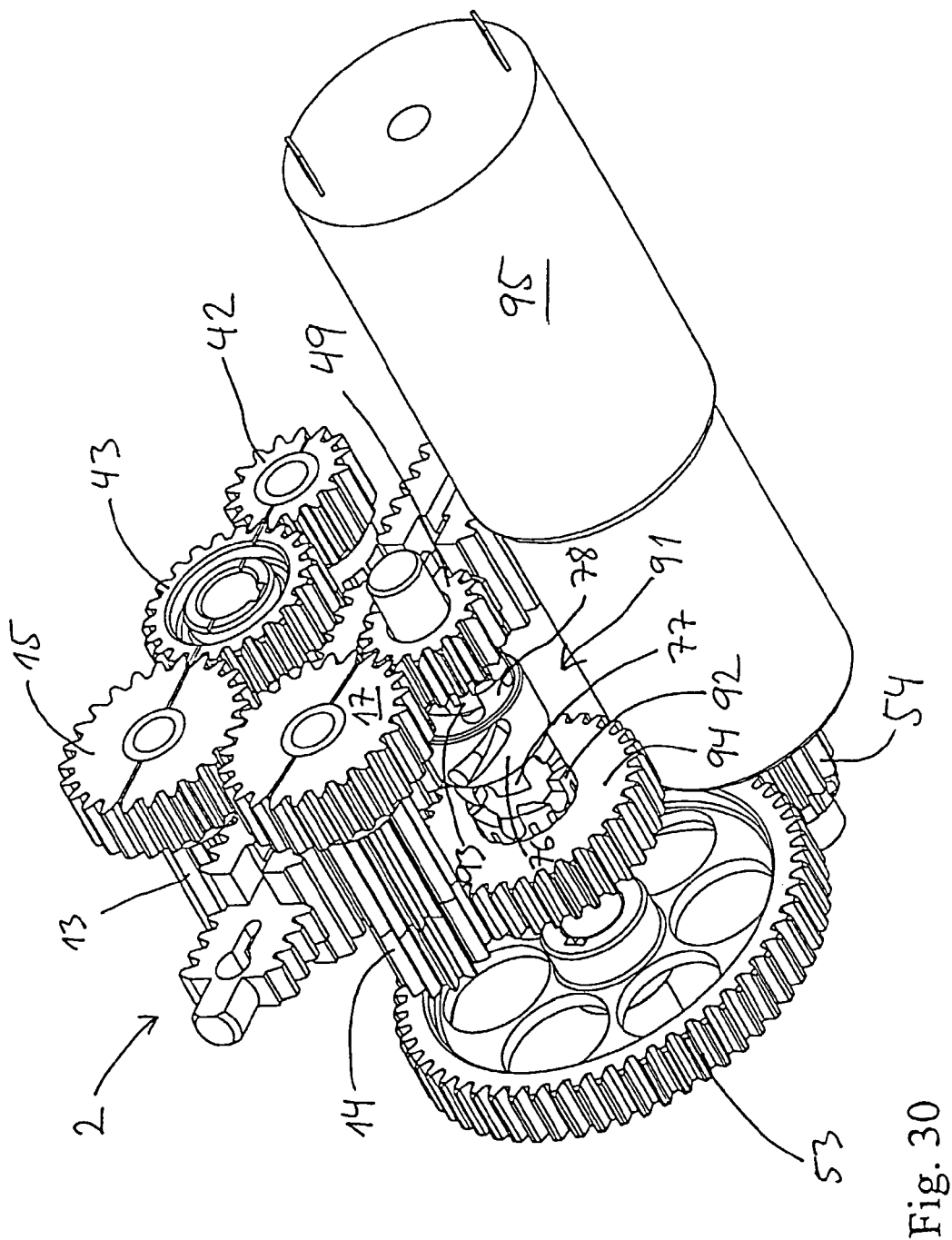
FIG. 30 is a perspective view of another embodiment of the driving mechanism of FIGS. 18 and 19, in an oblique bottom and front view.

Referring to FIG. 30 in the following, an alternative embodiment of the conveyor mechanism of FIGS. 18 and 19 is shown, using the double-acting coupling part 76 shown in FIGS. 24 and 25. The claw couplings 51, 62, their connecting plate member 64 and the first gear wheel 60, as shown in FIGS. 18 and 19, are left out in the embodiment shown in FIG. 30. In addition, FIG. 30 shows an electric motor 95, which drives the large driving wheel 53 by means of the motor driven toothed wheel 54.

When the large driving wheel 53 is rotating in a counterclockwise direction, as shown in FIG. 30, by displacing the coupling part 76 in the direction towards the left in the figure, the first claw part 77 of the coupling part 76 is able to engage with a claw part 92 of a medium-sized driving wheel 94 in direct engagement with the second driving wheel 14, whereby the articulated driving mechanism 2 is displaceable at a relatively high speed from the left to the right in the figure.

Figure 31:
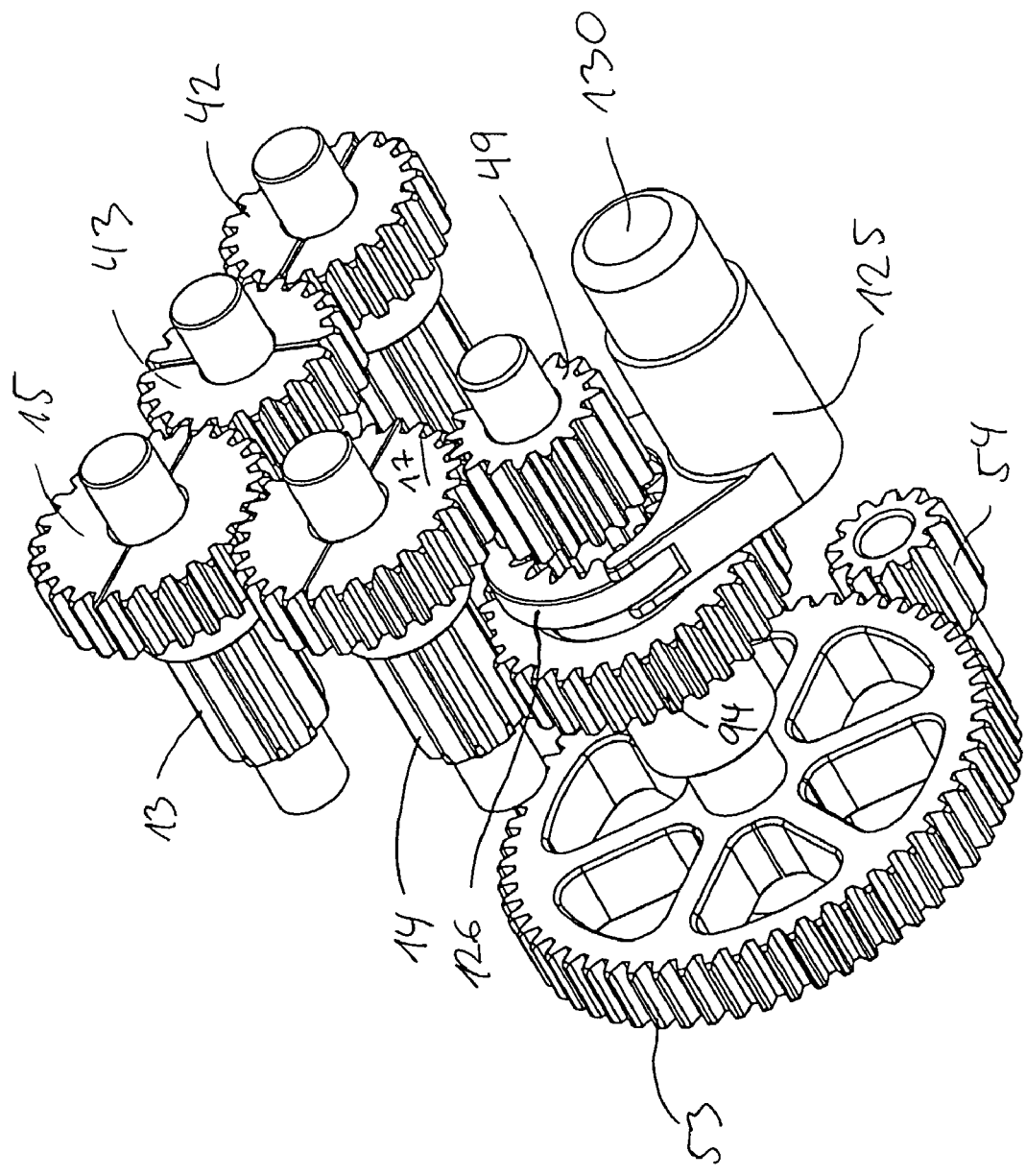
FIG. 31 is a perspective view of another embodiment of the driving mechanism of FIG. 30, in an oblique bottom and front view.
Figure 32:
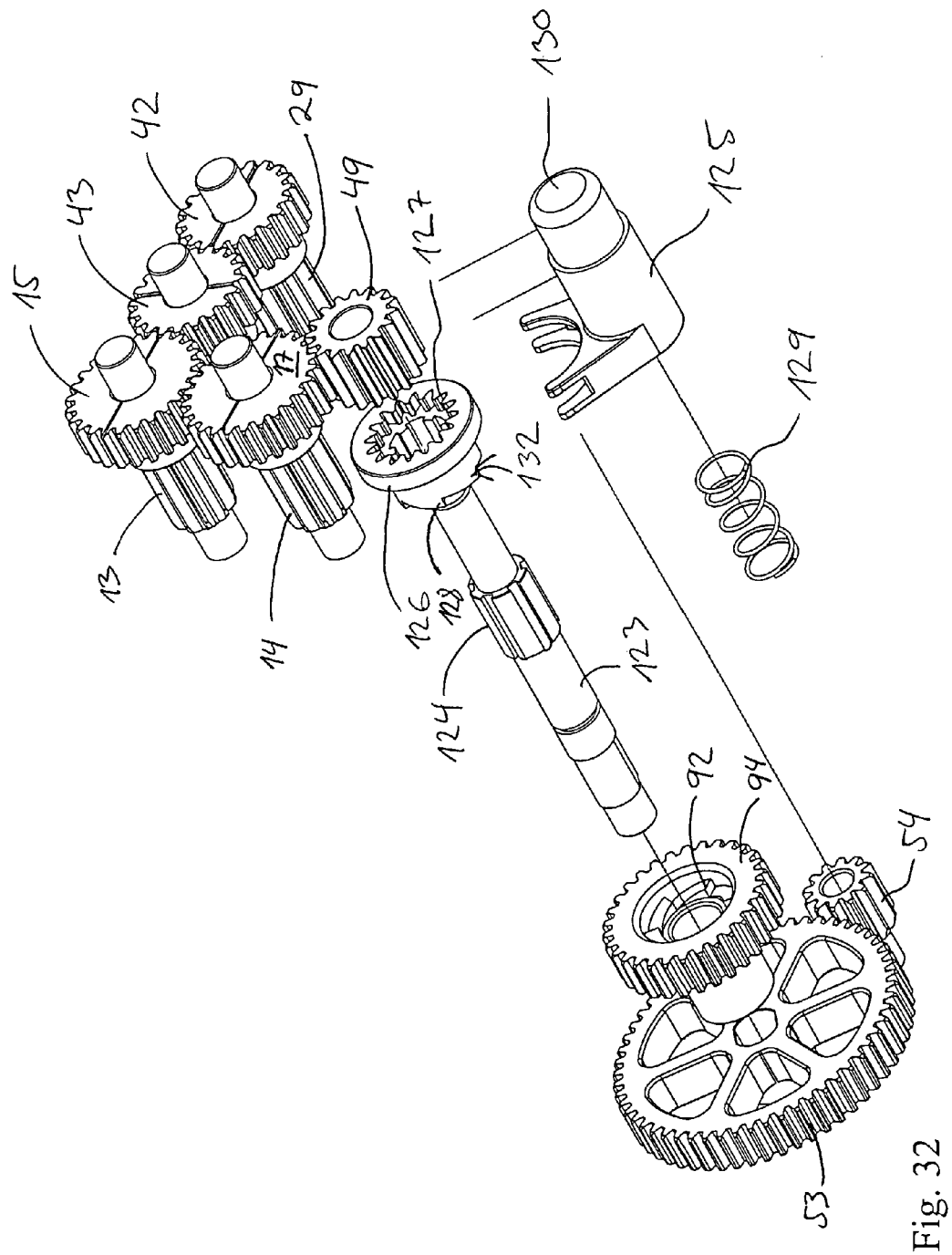
FIG. 32 is an exploded view of the embodiment of the driving mechanism shown in FIG. 31, in an oblique bottom and front view.

FIGS. 31 and 32 show an alternative embodiment of the conveyor mechanism of FIG. 30. This embodiment corresponds to the embodiment shown in FIG. 30, but instead of the coupling part 76, a coupling member 132 is used, which is arranged longitudinally displaceable on a spline 124 on a shaft 123. The driving wheel 53 is fixedly mounted on the shaft 123, so that the coupling member 132 rotates with the driving wheel 53. The coupling member 132 has a peripheral collar 126, around which a fork member 125 grasps and is thus able to displace the coupling member 132 into a first position, in which an inner toothing 127 of the coupling member 132 engages with the toothing of the second gear wheel 49, and a second position, in which a claw part 128 of the coupling member 132 engages with the claw part 92 of the medium-sized driving wheel 94 driving the second driving wheel 14. The fork member 125 is spring-loaded by means of a spring 129 so that, in its initial position, the coupling member 132 is in its first position, in which it is engaging with the second gear wheel 49. In this position, as described above, the driving mechanism can be displaced into the cartridge device at a relatively low velocity for pressing out material from a cartridge. In the second position of the coupling member 132, the driving mechanism can be guided in the opposite direction, i.e. be pulled out of the cartridge device, at a greater velocity because of the different gear ratio between the driving toothed wheel in this position. The fork member 125 is provided with a push button 130, which can be operated using one finger, and, furthermore, the fork member activates a switch, not shown, which reverses the direction of rotation of the dispenser driving motor 95. The embodiment shown in FIGS. 31 and 32 has the advantage that fewer members are used compared with the above-mentioned embodiments. In addition, the gear ratio is only changed when the push button 130 is activated for retraction of the driving mechanism, for example in order to replace a cartridge, and thus not when the driving motor is controlled to run in the opposite direction of rotation for a smaller degree of retraction of the driving mechanism in order to avoid afterflow, as described above. Said smaller degree of retraction of the driving mechanism may thus take place faster, because no coupling member has to change position.

On the other hand, when the large driving wheel 53 is rotating in a clockwise direction, as shown in FIG. 30, by displacing the coupling part 76 in the direction towards the right in the figure, the second claw part 78 of the coupling part 76 is able to engage with a claw part 93 of the second gear wheel 49, which drives the second wheel 17 located in front and with that the second driving wheel 14, so that the articulated driving mechanism 2 is displaceable at a relatively low speed from the right to the left in the figure.

The above mentioned claw couplings 51, 62, 91 may, of course, be replaced by any suitable type of free-wheel clutch, which, in a known manner, transmits rotational movement in one direction of rotation, but not in the other.

FIGS. 26 and 27 show a second link 79 in accordance with the invention. Instead of a male part and a female part, respectively, this link has a single flange 80, 81 at each end. In the embodiment shown, the flange 80 has an elongated hole 82, and the flange 81 has a cylindrical hole 83, but both flanges may instead have an elongated hole, so that the link 79 is symmetrical about a transverse central axis.

FIGS. 28 and 29 show another link 84 in accordance with the invention. This link 84 corresponds to the link shown in FIGS. 1 to 6, except it has tooth surfaces 85, 86 on the opposing sides perpendicularly to the axes of a cylindrical hole 87 of a female part 88 and an elongated hole 89 of a male part 90, respectively.

Figure 33:
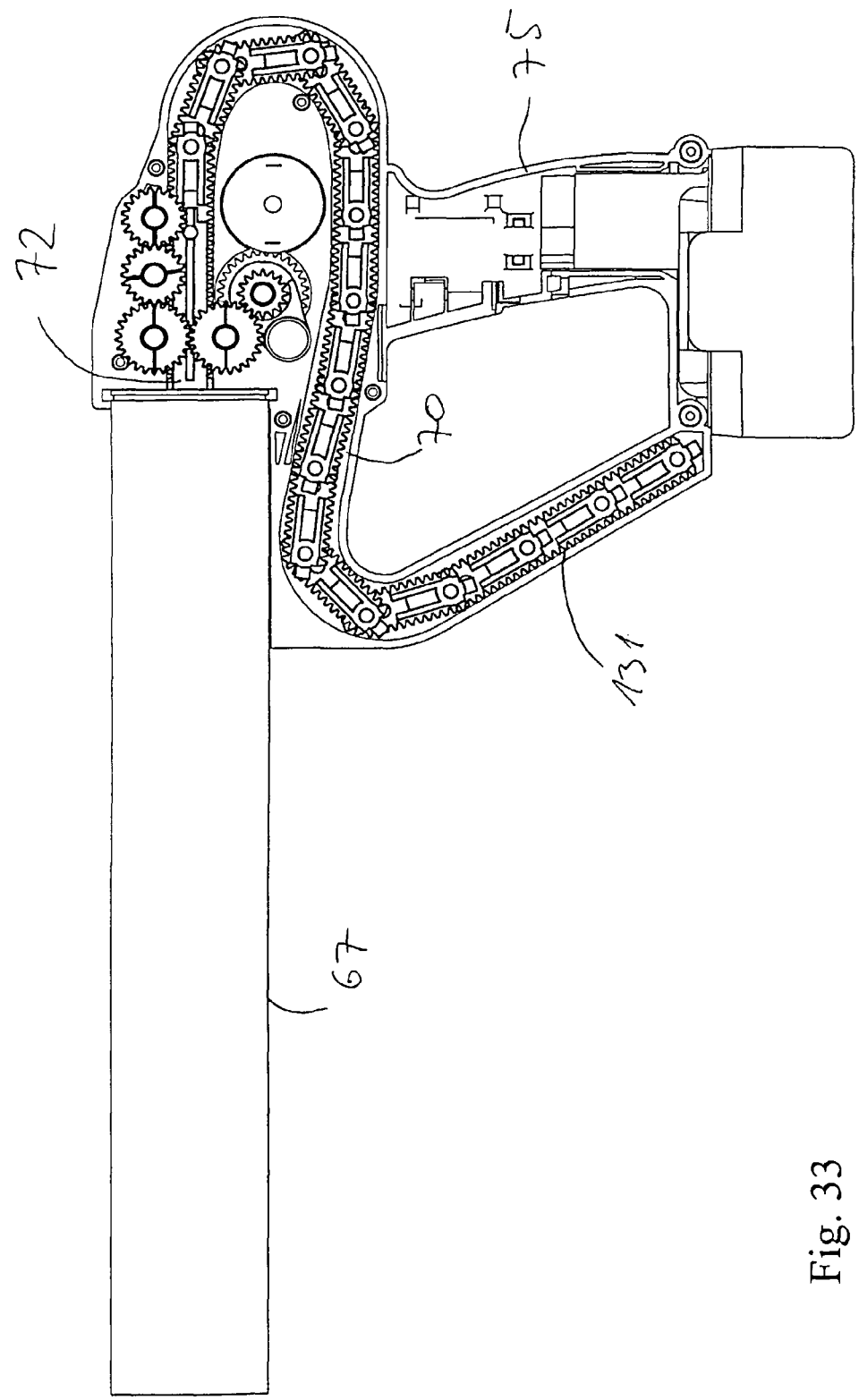
FIG. 33 is a side view of another embodiment of the dispenser shown in FIGS. 20 to 23, in which the driving mechanism has been pulled into the dispenser housing, and part of the housing has been removed.
Figure 34:
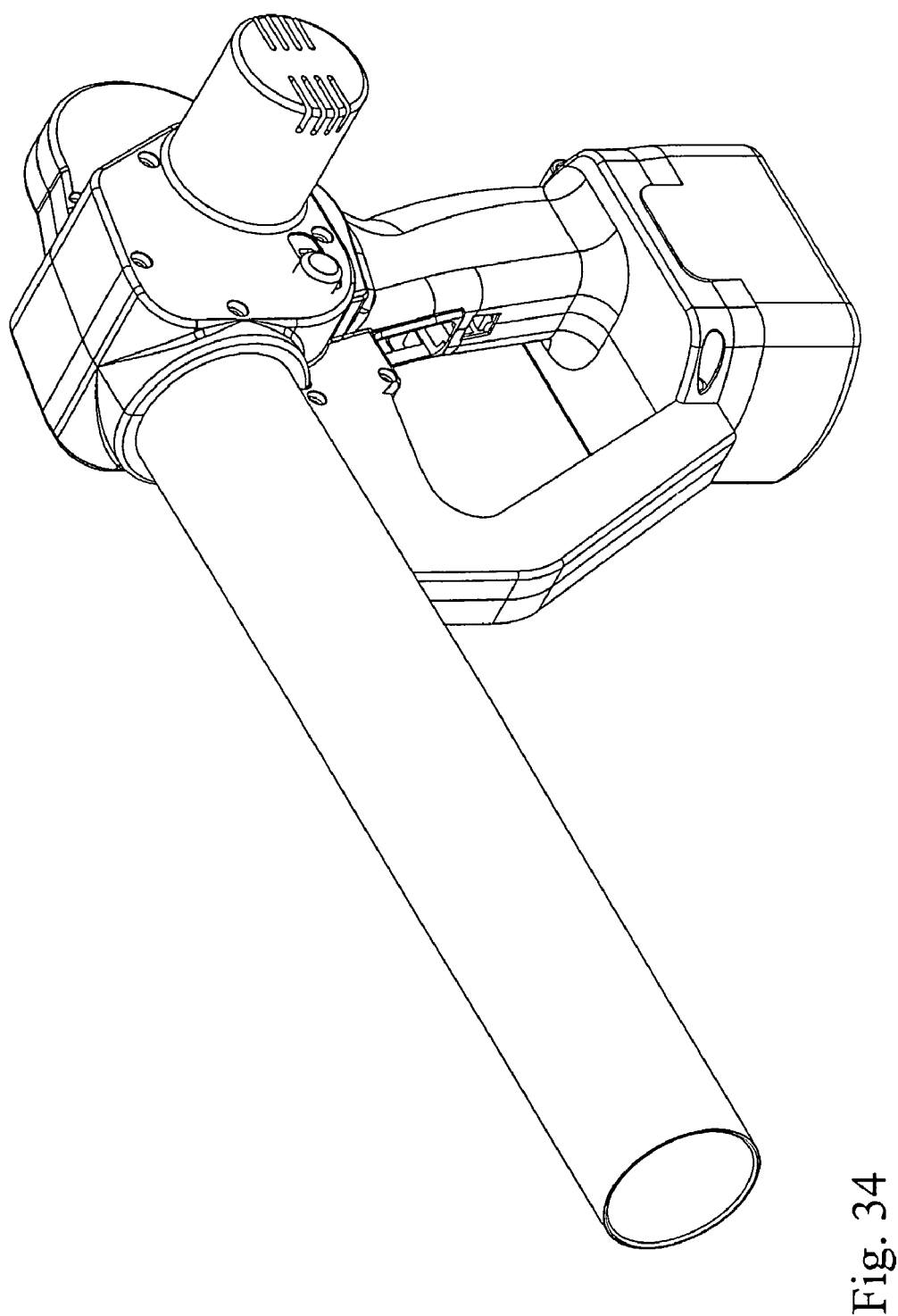
FIG. 34 is a perspective view of the dispenser of FIG. 33, in an oblique top and front view, FIGS. 35 to 39 constitute orthogonal views corresponding to FIGS. 1 to 5 of another embodiment of a link of the articulated driving mechanism according to the invention.
Figure 45:
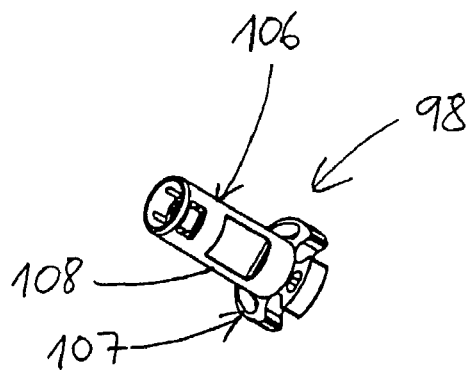
FIG. 45 is a perspective view of the link pin of FIGS. 41 to 44, and FIGS. 46 to 51 show an embodiment of the driving mechanism of the invention, composed of links according to FIGS. 35 to 40, in six different positions, respectively, when advancing the links, each of the figures constituting an orthogonal view as well as a perspective view of the driving mechanism.
Figure 41:
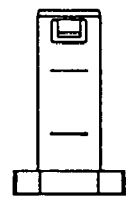
Figure 44:
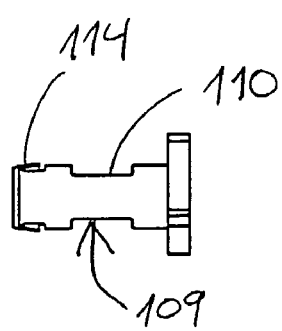

FIGS. 33 and 34 show another embodiment of the dispenser, in which the driving mechanism is guided in a S-shaped channel composed of three legs 72, 70, 131, one leg 131 running down along the handle 75 of the dispenser.

Although the invention is exemplified above having a toothed rack, the individual links may also be formed without toothing as a kind of chain link. Furthermore, it is clear that although the articulated driving mechanism of the invention has been described above in an embodiment for application in a dispenser, the articulated driving mechanism may be used in a number of situations, in which a linear movement is required, for example, for opening and closing garage doors, doors and windows, for raising and lowering tables, chairs, hospital beds and other equipment, etc. Obviously, the various described embodiments of the driving mechanism may be combined in any manner with the shown embodiments of the conveyor mechanism as well as the shown embodiments of the dispenser.

The invention claimed is:

1. An articulated driving mechanism comprised of several inflexible links in succession, the links of each pair of adjacent links being interconnected by means of a link pin, which is arranged in both adjacent links in such a manner that the links are pivotal in relation to one another about the axis of the pin, and each pair of adjacent links being lockable against pivoting in relation to one another, wherein the links of each pair of adjacent links are mutually displaceable, in the transverse direction of the link pin, between a first position, in which the adjacent links are pivotal in relation to one another about the axis of the link pin, and a second position, in which mutually corresponding meshing surfaces of each adjacent link abut one another and lock against mutual pivoting of the adjacent links, wherein the link pin is displaceable in an elongated hole in at least one of the links, wherein the driving mechanism is arranged in a longitudinally displaceable manner by means of a driving wheel and a displacement wheel, engaging with each their link of the driving mechanism, and wherein the driving wheel and the displacement wheel are driven at different roll speeds on their respective pitch circles, so that, on longitudinal displacement of the driving mechanism, as a consequence of rotation of the driving wheel and the displacement wheel, the adjacent links are displaceable between their first position and their second position.

2. An articulated driving mechanism according to claim 1, wherein the elongated hole ex-tends along a longitudinal axis of the link, in which it is formed, the longitudinal axis running through the two pins arranged in the link.

3. An articulated driving mechanism according to claim 1, wherein the elongated hole is comprised of two cylindrical holes connected by a slot with a width, which is smaller than a diameter of each of the cylindrical holes, and in that the link pin has a locking section located in the elongated hole and having a first cross-sectional dimension, which is smaller than or equals the width of the slot, and a second cross-sectional dimension, which is larger than the width of the slot.

4. An articulated driving mechanism according to claim 3, wherein the locking section of the link pin is cylindrical with a diameter corresponding to the second cross-sectional dimension of the locking section and has two opposite recesses, each having a flat bottom, the bottoms of the two recesses being mutually parallel and having a mutual distance corresponding to the first cross-sectional dimension of the locking section.

5. An articulated driving mechanism according to claim 3, wherein, at one end, the link pin has a disc-shaped head, the head having two spaced apart indentations along its periphery.

6. An articulated driving mechanism according to claim 5, wherein the indentations are spaced apart by a mutual angle of substantially 90 degrees.

7. An articulated driving mechanism according to claim 3, wherein the link pin has at least one latch means, which, upon pivoting of the link pin, may retain the link pin in three different positions in relation to one of the two adjacent links connected by the link pin, the link pin being displaceable in the elongated hole in its transverse direction in one of these positions and being locked against displacement in the elongated hole in the two other positions.

8. An articulated driving mechanism according to claim 5, wherein, at its periphery, opposite the space between the two indentations, the head has a projection, which may engage with one of three corresponding indentations formed with an approximately 90 degrees space in one of the two adjacent links connected by the link pin.

9. An articulated driving mechanism according to claim 8, wherein the head, radially within said projection, an arcuated recess is formed, enabling the projection to be radially resilient in relation to the head.

10. An articulated driving mechanism according to claim 5, wherein, at its end located opposite the head, the link pin has resilient flanges, which are able to retain the link pin in relation to one of the two adjacent links connected by the link pin.

11. An articulated driving mechanism according to claim 5, wherein each pin is arranged in a male part in the form of a flange of one of the adjacent links and in a female part in the form of two flanges with an intermediate slot of the other adjacent link, wherein the flange of the male part is located between the two flanges of the female part, wherein the elongated hole is formed in the flange of the male part, wherein each link has a slot in a lateral face along its longitudinal axis, and wherein the periphery of the pin head projects into the slot of the female part and flushes with said lateral face.

12. An articulated driving mechanism according to claim 1, wherein the pin is arranged in each pair of adjacent links in such a manner that it is displaceable in its longitudinal direction between a first position, in which it is displaceable in the elongated hole, in its transverse direction, and a second position, in which it is locked against displacement in the elongated hole, in its transverse direction.

13. An articulated driving mechanism according to claim 1, wherein the elongated hole is comprised of two cylindrical holes connected by a slot, which is more narrow than a diameter of each of the cylindrical holes, and wherein the pin has a first section with a diameter, which, substantially, corresponds to a diameter of each of the cylindrical holes, and a second section with a diameter, which is smaller than the width of the gap.

14. An articulated driving mechanism according to claim 13, wherein the cylindrical hole, which is comprised by the elongated hole, and which is located closest to the centre of the link, has a first section with a diameter, which, substantially, corresponds to the diameter of the first section of the pin, and a second section with a diameter, which is smaller than the diameter of the first section of the pin, and wherein the pin is spring-loaded in a direction from its first section to its second section.

15. An articulated driving mechanism according to claim 1, wherein the mutually corresponding meshing surfaces of each adjacent link abut one another by means of wedging in the second, locked position of the adjacent links.

16. An articulated driving mechanism according to claim 1, wherein each pin is arranged in a male part in the form of a flange of one of the adjacent links and in a female part in the form of two flanges with an intermediate gap of the second adjacent link, and wherein the flange of the male part is located between the two flanges of the female part.

17. An articulated driving mechanism according to claim 16, wherein each link comprises a male and a female part.

18. An articulated driving mechanism according to claim 16, wherein, at its outer end, the male part has a stud, which fits into a corresponding hole of the female part at the bottom of its gap, and/or wherein, at its outer ends, the flanges of the female part have a stud, which fits into a corresponding recess of the male part opposite its outer end.

19. An articulated driving mechanism according to claim 17, wherein the elongated hole is formed in the flange of the male part, wherein a first end of the pin is arranged with an intermediate compression spring in a cylindrical blind hole of one flange of the female part, and wherein a second end of the pin is arranged in a cylindrical hole in the other flange of the female part.

20. An articulated driving mechanism according to claim 1, wherein, in a lateral face, each link has a slot along its longitudinal axis, and wherein the pin is spring-loaded towards a position, in which an end portion of the pin projects from the bottom of the gap and flushes with the lateral face.

21. An articulated driving mechanism according to claim 1, wherein each link forms a section of a toothed rack, so that the links in the second position, in which the adjacent links are locked against pivoting in relation to one another, form a continuous toothed rack.

22. An articulated driving mechanism according to claim 21, wherein each link comprises two opposing tooth surfaces.

23. An articulated driving mechanism according to claim 21, wherein the mutual displacement distance of the adjacent links between their first position and their second position equals an integer times the tooth pitch of the tooth surfaces.

24. An articulated driving mechanism according to claim 22, wherein the flanges of the male part as well as of the female part form part of one of the tooth surfaces.

25. An articulated driving mechanism according to claim 1, wherein the links are made of plastic, and wherein the material of the links has been glass reinforced.

26. An articulated driving mechanism according to claim 12, wherein, in the area between the driving wheel and the displacement wheel, a stationary ramp is arranged, which displaces the pins between their first position and their second position, when the links pass it, so that the links, in at least one of the pairs of adjacent links, at a time, are displaceable in relation to one another.

27. An articulated driving mechanism according to claim 7, wherein, in the area between the driving wheel and the displacement wheel, two spaced apart stationary studs are arranged, which project into the slot when the links pass by and pivot the link pins between their three different positions when engaging one at a time with one of the two spaced apart indentations of the link pin heads, so that the links of at least one pair of adjacent links, at a time, are displaceable in relation to one another.

28. A dispenser for pressing out material from a cartridge device, the dispenser comprising an articulated driving mechanism comprised of several in-flexible links in succession, the links of each pair of adjacent links being interconnected by means of a link pin, which is arranged in both adjacent links in such a manner that the links are pivotal in relation to one another about the axis of the pin, and each pair of adjacent links being lockable against pivoting in relation to one another, wherein the links of each pair of adjacent links are mutually displaceable, in the transverse direction of the link pin, between a first position, in which the adjacent links are pivotal in relation to one another about the axis of the link pin, and a second position, in which mutually corresponding meshing surfaces of each adjacent link abut one another and lock against mutual pivoting of the adjacent links, wherein the link pin is displaceable in an elongated hole in at least one of the links, wherein the driving mechanism is arranged in a longitudinally displaceable manner by means of a driving wheel and a displacement wheel, engaging with each their link of the driving mechanism, and wherein the driving wheel and the displace-ment wheel are driven at different roll speeds on their respective pitch circles, so that, on longitudinal displacement of the driving mechanism, as a consequence of rotation of the driving wheel and the displacement wheel, the adjacent links are displace-able between their first position and their second position.

29. A dispenser according to claim 28, wherein a first end of the driving mechanism is provided with a piston for pressing out material from a cartridge device, wherein a first driving wheel and a second driving wheel are journaled at the cartridge device, the driving wheels facing one another, being driven synchronously, counter-rotating and engaging with opposite tooth surfaces of the articulated driving mechanism, wherein, at a distance from the driving wheels and opposite the cartridge device relative to these, a displacement wheel is journaled in engagement with a tooth surface of the articulated driving mechanism, wherein the displacement wheel is located on the same side of the driving mechanism as the first driving wheel and is driven with the same direction of rotation as this, but at a greater roll speed on its pitch circle, and wherein a second end of the driving mechanism is guided in a U-shaped channel.

30. A dispenser according to claim 29, wherein the displacement wheel is driven at such a difference in roll speed on its pitch circle in relation to the driving wheels, that when the driving mechanism by means of the driving wheels has been displaced by a link length, it has been displaced by a link length plus the mutual displacement distance of the adjacent links between their first position and their second position by means of the displacement wheel.

31. A dispenser according to claim 30, wherein the length of one link of the driving mechanism corresponds to eight times the pitch on the tooth surface of that link, wherein the mutual displacement distance of the adjacent links between their first position and their second position corresponds to two times the pitch, wherein the axis distance between the displacement wheel and the first driving wheel located on the same side of the driving mechanism corresponds to 14 times the pitch, and wherein the roll speed on the pitch circle of the displacement wheel is 5/4 of the roll speed on the pitch circle of the first driving wheel.

32. A dispenser according to claim 31, wherein the displacement wheel has 10 teeth and is connected by means of a shaft with a rearwardly located wheel having 16 teeth and being driven by an intermediate wheel having 22 teeth, and wherein the intermediate wheel is engaging with a first wheel located in front having 24 teeth and being connected by means of a shaft with the first driving wheel having 12 teeth.

33. A dispenser according to claim 30, wherein, via a first claw coupling, the intermediate wheel is driven by a first gear wheel engaging with a large driving wheel, wherein, via a second claw coupling, the large driving wheel drives a second gear wheel engaging with a second wheel located in front being connected by means of a shaft with the second driving wheel, wherein the first claw coupling is arranged so that it only transfers rotational movement, when the large driving wheel is rotating in a direction causing the first end of the driving mechanism to be pulled in from the cartridge device, and wherein the second claw coupling is arranged so that it only transfers rotational movement, when the large driving wheel is rotating in a direction causing the first end of the driving mechanism to be pushed out into the cartridge device.

34. A dispenser according to claim 33, wherein the first claw coupling comprises a first coupling part mounted in a longitudinally displaceable manner, but rotationally fixed, on a first coupling shaft, on which the intermediate wheel is fixedly mounted, wherein this first coupling part has tilted teeth for engagement with corresponding teeth on a second coupling part formed integrally with the first gear wheel, wherein the second claw coupling comprises a first coupling part mounted in a longitudinally displaceable manner on a second coupling shaft, on which the large driving wheel is fixedly mounted, where a pin projecting from this second coupling shaft is engaging with an elongated hole tilted in relation to the longitudinal axis of the shaft in the first coupling part, wherein the first coupling part of the second claw coupling is spring-loaded away from and has tilted teeth for engagement with corresponding teeth on a second coupling part formed integrally with the second gear wheel, and wherein the first coupling part of the first claw coupling and the first coupling part of the second claw coupling are mutually connected by means of a plate member for mutually, longitudinally displacing one an-other.

35. A dispenser according to claim 29, wherein the displacement wheel is connected by means of a shaft with a rearwardly located wheel driven by an intermediate wheel, and wherein the intermediate wheel is engaging with a first wheel located in front and being connected by means of a shaft with the first driving wheel, wherein a second wheel located in front and being connected by means of a shaft with the second driving wheel is engaging with the first wheel located in front, wherein the second wheel located in front is engaging with a second gear wheel, and wherein a large driving wheel is fixedly mounted on a drive shaft, on which a coupling member is mounted for rotation with the drive shaft and axially displaceable on it, so that, in a first position, the coupling member is engaging with the second gear wheel and, in a second position, it is engaging with a medium-sized driving wheel pivotally mounted on the drive shaft and engaging with the second driving wheel.

36. A dispenser according to claim 35, wherein the coupling member has an inner toothing for engagement with the toothing of the second gear wheel in the first position of the coupling member and a claw part for engagement with a claw part of the medium-sized driving wheel in the second position of the coupling member.

37. A dispenser according to claim 36, wherein the coupling member has a peripheral collar, around which a fork member grasps, and wherein the fork member is displaceable in parallel to the drive shaft and is spring-loaded in a direction for displacement of the coupling member towards its first position.

38. A dispenser according to claim 29, wherein the U-shaped channel is comprised of two legs connected by an arch, and wherein one of the legs curves in under a bottom of the cartridge device, and approaches a longitudinal axis of the second leg in the direction towards its free end.

39. A dispenser according to claim 29, wherein the U-shaped channel is comprised of two legs connected by an arch, wherein one leg curves in under a bottom of the cartridge device, this leg continuing into a downwardly curving leg running along a handle of the dispenser, so that altogether an approximately S-shaped channel for the driving mechanism is formed.

* * * * *